United States Patent
Kelly

(10) Patent No.: US 11,475,602 B2
(45) Date of Patent: *Oct. 18, 2022

(54) IMAGE PROCESSING SYSTEM AND METHOD

(71) Applicant: PANAMORPH, INC., Colorado Springs, CO (US)

(72) Inventor: Shawn L. Kelly, Colorado Springs, CO (US)

(73) Assignee: PANAMORPH, INC., Colorado Springs, CO (US)

( * ) Notice: Subject to any disclaimer, the term of this patent is extended or adjusted under 35 U.S.C. 154(b) by 214 days.

This patent is subject to a terminal disclaimer.

(21) Appl. No.: 17/086,399

(22) Filed: Oct. 31, 2020

(65) Prior Publication Data

US 2021/0049792 A1 Feb. 18, 2021

Related U.S. Application Data

(62) Division of application No. PCT/US2019/031625, filed on May 9, 2019.

(Continued)

(51) Int. Cl.
| | | |
|---|---|---|
| *G06T 9/00* | (2006.01) | |
| *G06T 5/00* | (2006.01) | |
| *G06T 5/20* | (2006.01) | |
| *H04N 19/112* | (2014.01) | |
| *H04N 19/132* | (2014.01) | |

(Continued)

(52) U.S. Cl.
CPC ............... *G06T 9/00* (2013.01); *G06T 5/003* (2013.01); *G06T 5/005* (2013.01); *G06T 5/10* (2013.01); *G06T 5/20* (2013.01); *H04N 19/112* (2014.11); *H04N 19/132* (2014.11); *H04N 19/16* (2014.11); *H04N 19/80* (2014.11); *H04N 19/85* (2014.11); *G06T 2200/16* (2013.01); *G06T 2207/20192* (2013.01); *G06T 2207/30168* (2013.01)

(58) Field of Classification Search
CPC .......... G06T 9/00; G06T 5/003; G06T 5/005; G06T 5/10; G06T 5/20; G06T 2200/16; G06T 2207/20192; G06T 2207/30168; G06T 7/0002; H04N 19/112; H04N 19/132; H04N 19/16; H04N 19/80; H04N 19/85; H04N 19/36
USPC ....................................................... 382/243
See application file for complete search history.

(56) References Cited

U.S. PATENT DOCUMENTS

| | | |
|---|---|---|
| 5,121,448 A | 6/1992 | Katayama et al. |
| 5,881,176 A | 3/1999 | Keith et al. |

(Continued)

FOREIGN PATENT DOCUMENTS

WO 2019217754 A1 11/2019

OTHER PUBLICATIONS

Taubman et al. "JPEG2000: Standard for interactive imaging." In: Proceedings of the IEEE 90.8. Aug. 2002 (Aug. 2002).

(Continued)

*Primary Examiner* — Ali Bayat
(74) *Attorney, Agent, or Firm* — Kurt L. VanVoorhies

(57) ABSTRACT

Initial low-quality images of a progressively-displayed high-definition image are masked with corresponding progressively-revealing mask filters or masking algorithms to realistically obscure such low quality and therefore to provide a realistically appearing progressive presentation of the high-definition image.

23 Claims, 15 Drawing Sheets

Related U.S. Application Data

(60) Provisional application No. 62/669,296, filed on May 9, 2018.

(51) Int. Cl.

| | | |
|---|---|---|
| *H04N 19/16* | (2014.01) | |
| *H04N 19/80* | (2014.01) | |
| *H04N 19/85* | (2014.01) | |
| *G06T 5/10* | (2006.01) | |

(56) References Cited

U.S. PATENT DOCUMENTS

| | | | |
|---|---|---|---|
| 7,366,319 B2 | 4/2008 | Andrew et al. | |
| 9,253,013 B1* | 2/2016 | Kolam | H04L 9/40 |
| 9,509,764 B1* | 11/2016 | Kolam | H04L 67/5682 |
| 9,953,014 B1* | 4/2018 | Reshadi | G06F 16/9574 |
| 10,009,439 B1* | 6/2018 | Kolam | H04L 67/02 |
| 10,178,147 B1* | 1/2019 | Kolam | H04L 67/02 |
| 2003/0081846 A1 | 5/2003 | Whitehead | |
| 2004/0062305 A1 | 4/2004 | Dambrackas | |
| 2004/0230613 A1 | 11/2004 | Goldstein et al. | |
| 2008/0144962 A1 | 6/2008 | Jung et al. | |
| 2012/0206474 A1 | 8/2012 | Holland et al. | |
| 2013/0162678 A1 | 6/2013 | Harris | |
| 2013/0229436 A1 | 9/2013 | Freyhult et al. | |
| 2014/0286588 A1 | 9/2014 | Kelly | |
| 2015/0178946 A1 | 6/2015 | Krishnaswamy et al. | |
| 2015/0178951 A1 | 6/2015 | Kelly | |
| 2015/0237382 A1 | 8/2015 | Nishida et al. | |
| 2016/0373613 A1 | 12/2016 | Kelly | |
| 2019/0052913 A1* | 2/2019 | Hachfeld | H04N 19/184 |
| 2020/0029099 A1* | 1/2020 | Hachfeld | H04N 19/93 |
| 2020/0177767 A1 | 6/2020 | Kelly | |
| 2021/0058629 A1 | 2/2021 | Kelly | |

OTHER PUBLICATIONS

PCT-ISA/US, International Search Report and Written Opinion of International Searching Authority & Search History in International Application No. PCT/US2019/031625, dated Jul. 23, 2019, 10 pages.

Crocker, Lee, Boulay, Paul and Morra, Mike; "DHALF.TXT", Internet document downloaded oon Dec. 23, 2913, 25 pages.

Ford, Adrian and Roberts, Alan; "Colour Space Conversions", Aug. 11, 1998, Internet document downloaded on Feb. 26, 2014 from http://poynton.com/PDFs/coloureq.pdf, 31 pages.

Zervos, Michalis, "Image dithering in Matlab", Internet document downloaded on Feb. 11, 2014 from http://michal.is/projects/image-dithering-in-matlab/, 13 pages.

Unknown Author, "Ordered Dithering", Internet document downloaded on Feb. 11, 2014 from http://www.visgraf.impa.br/Courses/ip00/proj/Dithering1/ordered_dithering.html, 2 pages.

Wikipedia, the free encyclopedia, "Ordered dithering", Internet document downloaded on Feb. 11, 2014, 3 pages.

Wikipedia, the free encylopedia, "Chrominance", Internet document downloaded on Feb. 24, 2014 from http://en.wikipedia.org/wiki/Chrominance, 3 pages.

Wikipedia, the free encyclopedia, "Luma (video)", Internet document downloaded on Feb. 24, 2014 from http://en.wikipedia.org/wiki/Luma_(video), 2 pages.

* cited by examiner

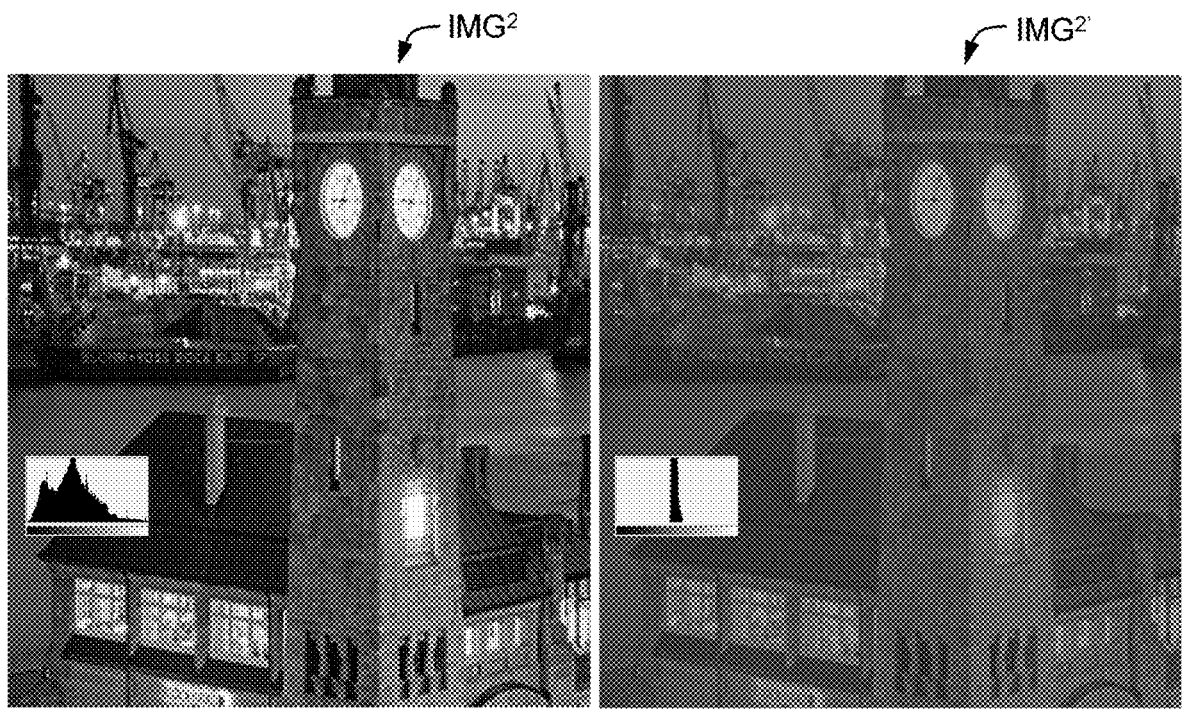
FIG. 5a  FIG. 5b
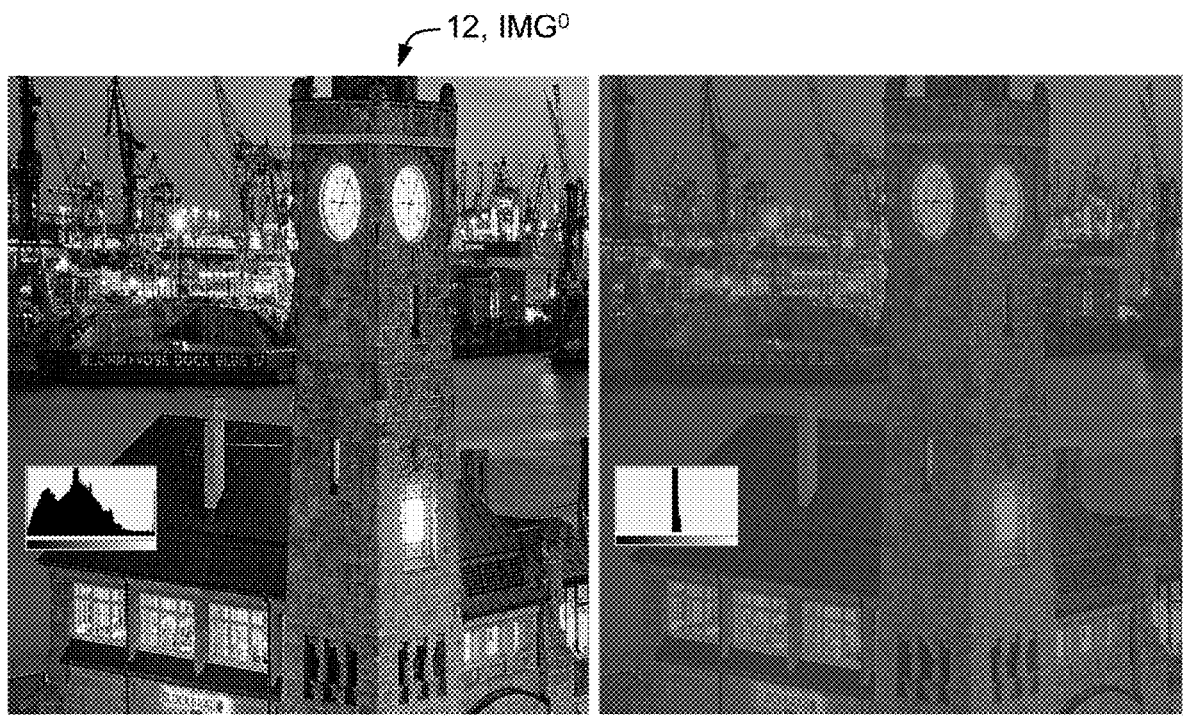
FIG. 5c  FIG. 5d

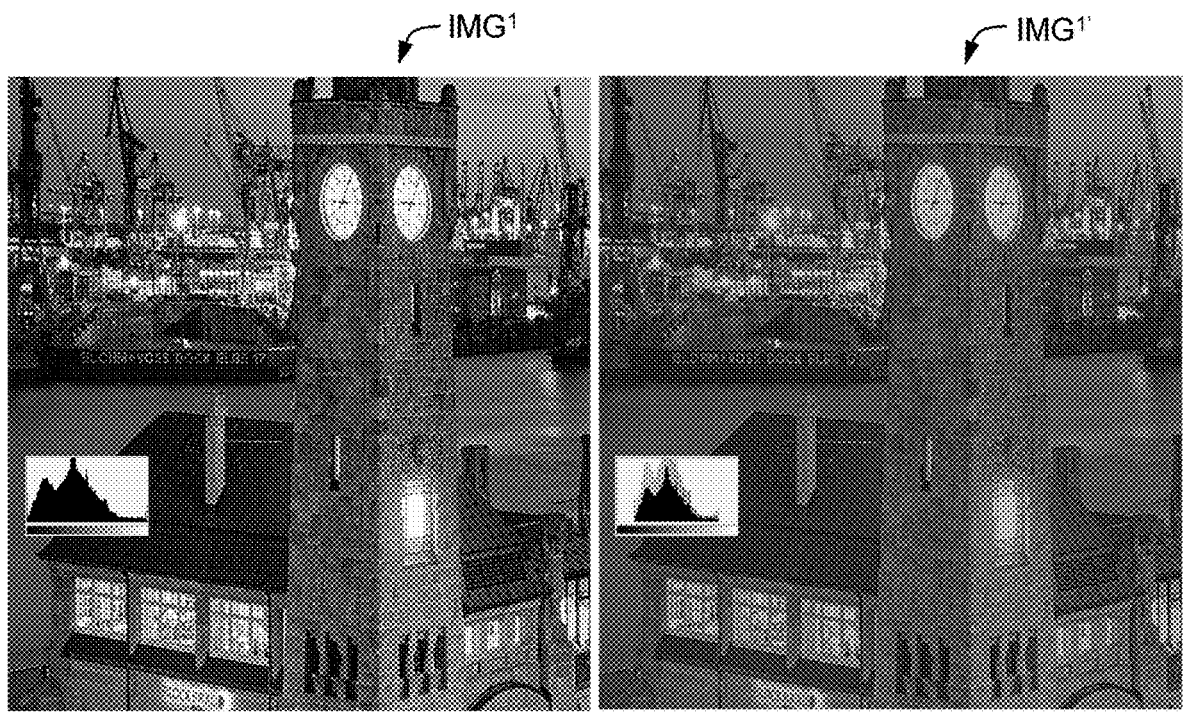
FIG. 6a  FIG. 6b
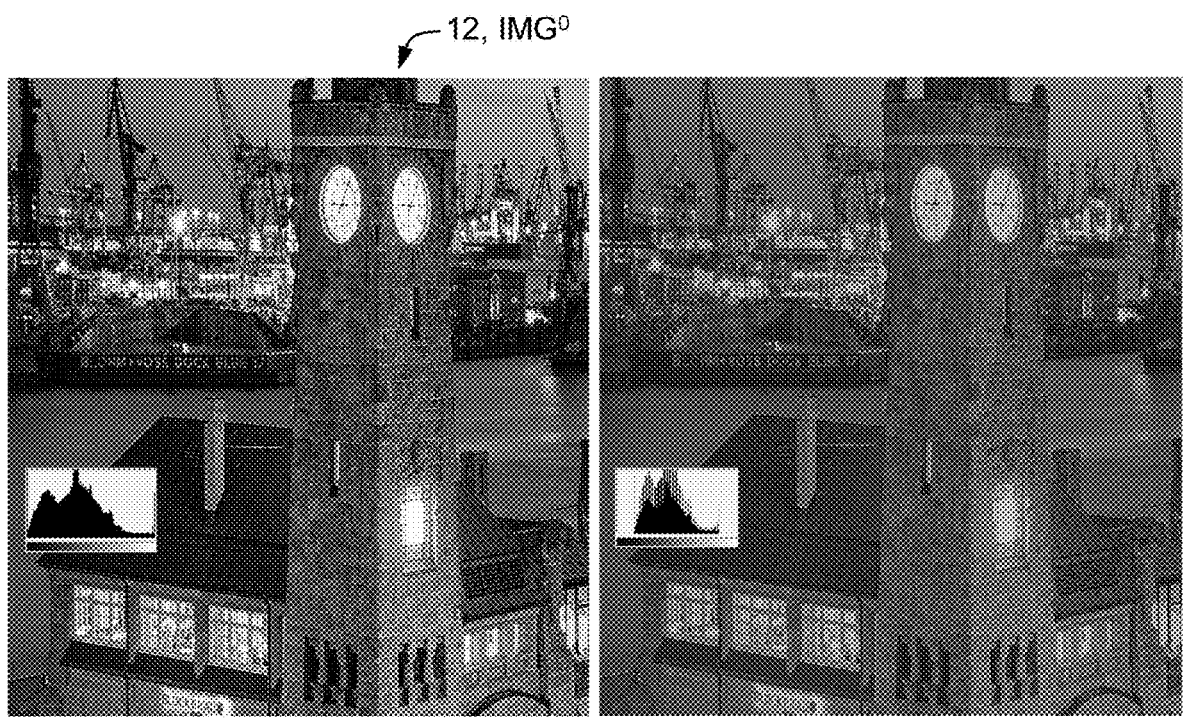
FIG. 6c  FIG. 6d

IMAGE PROCESSING SYSTEM AND METHOD

CROSS-REFERENCE TO RELATED APPLICATIONS

The instant application is a division of International Application No. PCT/US2019/031625 filed on 9 May 2019, which claims the benefit of prior U.S. Provisional Application Ser. No. 62/669,296 filed on 9 May 2018. Each of the above-identified applications is incorporated herein by reference in its entirety.

BRIEF DESCRIPTION OF THE DRAWINGS

FIG. 5a illustrates a second-progression, second-quality intermediate image associated with the progressive display of the high-definition image illustrated in FIGS. 4c and 5c, together with a histogram of associated image pixel values for the entire second-quality intermediate image, wherein the second-quality intermediate image has a higher quality than the first-quality intermediate image illustrated in FIG. 4a;

FIG. 5b illustrates a masked version of the second-progression, second-quality intermediate image illustrated in FIG. 5a, together with a histogram of associated image pixel values for the entire masked second-progression, second-quality intermediate image;

FIG. 5c illustrates, for purposes of comparison, the high-definition image—the same as illustrated in FIG. 4c—from which the second-progression, second-quality intermediate image illustrated in FIG. 5a is derived, together with a histogram of associated image pixel values for the entire high-definition image;

FIG. 5d illustrates a masked version of the high-definition image illustrated in FIG. 5c together with a histogram of associated image pixel values for the entire masked high-definition image, wherein the associated filter-mask parameter—associated with the associated histogram—was selected so that the corresponding images of FIGS. 5b and 5d had similar appearance;

FIG. 6a illustrates a third-progression, third-quality intermediate image associated with the progressive display of the high-definition image illustrated in FIGS. 4c, 5c and 6c, together with a histogram of associated image pixel values for the entire third-quality intermediate image, wherein the third-quality intermediate image has a higher quality than the second-quality intermediate image illustrated in FIG. 5a;

FIG. 6b illustrates a masked version of the third-progression, third-quality intermediate image illustrated in FIG. 6a, together with a histogram of associated image pixel values for the entire masked third-progression, third-quality intermediate image;

FIG. 6c illustrates, for purposes of comparison, the high-definition image—the same as illustrated in FIGS. 4c and 5c—from which the third-progression, third-quality intermediate image illustrated in FIG. 6a is derived, together with a histogram of associated image pixel values for the entire high-definition image;

FIG. 6d illustrates a masked version of the high-definition image illustrated in FIG. 6c, together with a histogram of associated image pixel values for the entire masked high-definition image, wherein the associated filter-mask parameter—associated with the associated histogram—was selected so that the corresponding images of FIGS. 6b and 6d had similar appearance;

DESCRIPTION OF EMBODIMENT(S)

Figure 1:
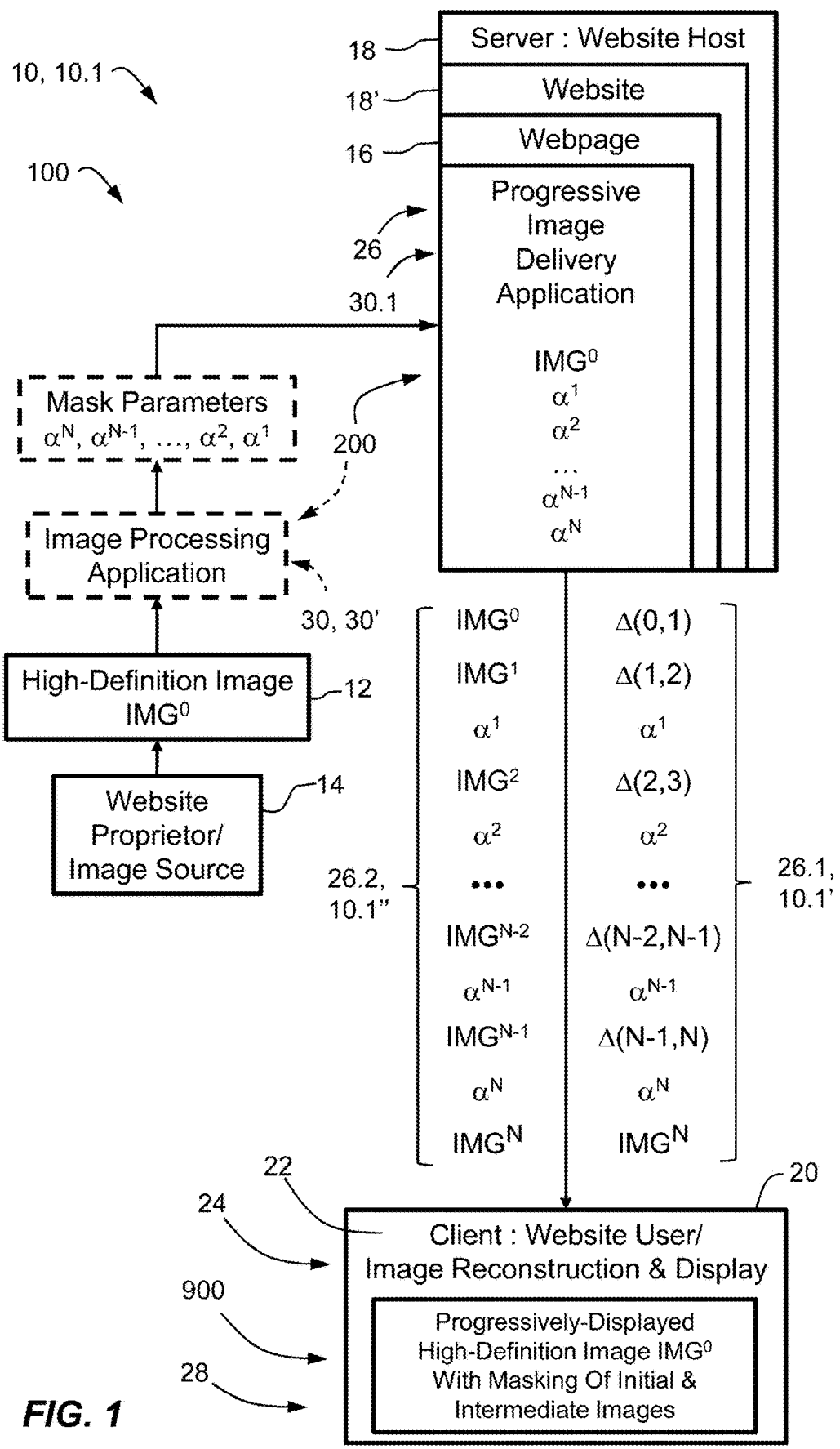
FIG. 1 illustrates a first aspect of an image processing system that provides for progressively masking a progressively-displayed high-definition image so as to provide for obscuring artifacts in associated intermediate images, masked versions of which are progressively displayed leading up to the display of the final high-definition image.

Referring to FIG. 1, a first aspect 10.1 of an image processing system 10, 10.1 provides for uploading both a high-definition image 12, $IMG^0$ and an associated set of mask parameters $\alpha^N, \alpha^{N-1}, \ldots, \alpha^2, \alpha^1$ from a website proprietor 14 to a webpage 16 of a server device 18, acting as an internet webserver 18', for distribution to a client internet-connected receiving device 20, for example, operating an internet web browser 22 under control of a user 24.

Due to transmission bandwidth limitations, the transmission, receipt and display of a high-quality digital image is often preceded by one or more relatively lower quality, and therefore lower bandwidth, initial and/or intermediate image representations so that viewer(s) thereof has/have a perceived lower delay before being able to assimilate image content. Such a practice is inherent in many progressive image delivery methods which either incrementally reconstruct and display higher spatial image quality from an initial low-quality image as additional image data is received, or alternatively, which simply include the transmission, receipt and display of initial, low-quality placeholder images prior to the receipt and display of the separate higher quality image. However, the low-quality initial or intermediate images of such methods are typically of such low spatial quality that they may appear heavily pixelated, and therefore artificial or heavily blurred. These initial images therefore represent a sufficiently substantial and unrealistic compromise of spatial quality that many viewers prefer to simply wait for the final high-quality image without having to view any prior intermediate image representations.

Generally, the progressive transmission and display of images provides for transforming the content of a relatively-higher-quality image into a base image and one or more image supplements, or supplemental images, wherein the base image is transmitted and displayed first, and the one or more image supplements or supplemental images are progressively transmitted and progressively used to increase the quality of, or detail in, the associated displayed image.

In accordance with a first aspect 26.1 of a progressive imaging process 26, 26.1, successive image supplements $\Delta(k-1, k)$ are combined with the image content of a predecessor image to generate its successor image, the latter being of relatively greater quality than the former, wherein generally image supplement $\Delta(k-1, k)$ provides for transforming the $k^{th}$ image of the progression into the corresponding $(k-1)^{st}$ image of the progression. For example, in accordance with what is known as "progressive JPEG" (Joint Photographic Experts Group), each image supplement $\Delta(k-1, k)$ comprises an additional set of coefficients for building detail of higher spatial frequency in the JPEG-restored image. Alternatively, a high-quality image may be progressively, and losslessly, transmitted, reconstructed and displayed in accordance with the teachings of U.S. Pat. No. 8,798,136 or 8,855,195, each of which are incorporated herein by reference, wherein the image supplements $\Delta,(i,j)$ comprise the associated extra data that are combined with data of a predecessor image to generate a relatively-higher quality successor image. In accordance with an interlaced imaging process, each image supplement $\Delta(k-1, k)$ may comprise values for additional pixels that were missing from the predecessor image.

In accordance with a second aspect 26.2 of a progressive-imaging process 26, 26.2, distinct supplemental images $IMG^{K-1}$ are successively displayed, wherein each successive supplemental images $IMG^{K-1}$ is a relatively-higher quality image that replaces a corresponding relatively-lower quality, and therefore, relatively-smaller bandwidth, predecessor image $IMG^K$. More particularly, in accordance with a first embodiment 10.1' of the first-aspect image processing system 10, 10.1' incorporating an associated first-aspect progressive imaging process 26, 26.1, upon request from a user 24 seeking to display the high-definition image 12, IMG$^0$ on the client internet-connected receiving device 20, the server device 18 initially transmits a base image IMG$^N$, followed by image supplements Δ(N−1,N), Δ(N−2,N−1), ..., Δ(2,3), Δ(1,2), Δ(0−,1) thereto that provide for progressively improving the resolution of the displayed image, culminating with the display of the original high-definition image 12, IMG$^0$ to the extent possible, wherein, for example, a first image supplement Δ(N−1,N) provides for generating a first-improved image IMG$^{N-1}$ from the original base image IMG$^N$, a second image supplement Δ(N−2,N−1) provides for generating a second-improved image IMG$^{N-2}$ from the first-improved image IMG$^{N-1}$, and so on until the last image supplement Δ(0, 1) provides for generating the high-definition image 12, IMG$^0$ from the next-to-last-improved image IMG$^1$. The server device 18 further transmits the mask parameters α$^N$, α$^{N-1}$, ..., α$_2$, α$^1$ that provide for masking the displayed images so as to obscure progressive-display-related artifacts therein, in accordance with an associated masking process.

Alternatively, in accordance with a second embodiment 10.1" of the image processing system 10, 10.1", the first-aspect image processing system 10, 10.1" may alternatively utilize an underlying second-aspect progressive-imaging process 26.2, wherein independent intermediate images IMG$^{N-1}$, image IMG$^{N-2}$, ..., image IMG$^2$, image IMG$^1$, and eventually the final image IMG$^0$, are each transmitted in succession, rather than the above-described image supplements Δ,(i,j), wherein the separate independent intermediate images IMG$^{N-1}$, image image IMG$^{N-2}$, ..., image IMG$^2$, image IMG$^1$ are each accompanied by the mask parameters α$^N$, α$^{N-1}$, ..., α$^2$, α$^1$ that provide for masking the displayed images so as to obscure progressive-display-related artifacts therein, in accordance with an associated masking process, the same as for the above-described first embodiment 10.1' of the first-aspect image processing system 10, 10.1'.

The image processing system 10, 10.1 provides for masking the above-described artifacts in the initial and/or intermediate image representations so that the underlying relatively low quality of these images is not perceived as such by the viewers, but instead, the viewer perceives an image having an underlying relatively high-quality content that emerges from a fog as the quality of the underlying intermediate images improves.

This masking process can significantly improve the perceived spatial quality of progressively-delivered initial and intermediate images of progressive image delivery methods by restricting the spatial detail visibility of such images so that low spatial quality is not immediately apparent, while simultaneously providing an impression or illusion of presumed high spatial quality being seen through, or behind, a realistic obscuring medium, for example, similar to a fog or haze, which obscures the presumed higher quality of the image. Accordingly, the presentation of progressively higher quality images with a concurrent progressive reduction of this obscuration gives the appearance of a gradual but realistic removal or clearing of the perceived obscuring medium to reveal the final image quality which was reasonably presumed to always exist but for the obscuration. This limitation of spatial visibility, hereinafter referred to as "masking", may include, but is not limited to, reductions in contrast, with or without changes in transparency, brightness and/or color, as represented by modifications of pixel values, for example, in one set of embodiments, resulting in, at a minimum, a compression or limitation of the range of tonal values of the image histogram relative to that of the unmasked image. For example, in general, such a compression or limitation may be applied by a transformation of the image tonal values by an associated mask filter 28 as follows:

$$\text{OutputPixelValue}(i,j,k) = T(\alpha^k) \cdot \text{BackgroundPixelValue}(i,j) + (1 - T(\alpha^k)) \cdot P(i,j,k) \quad (1)$$

wherein:

$$P(i,j,k) = \text{HalfMax} + \text{Bias}(\alpha^k) + (\alpha^k) \cdot (\text{InputPixelValue}(i,j,k) - \text{HalfMax}) \quad (2)$$

and:

j are pixel coordinates in the display;

k is the progressive image progression level, wherein k=0 for the original high-quality image, and k=N for the lowest quality version of that image;

α$^k$ is the mask parameter used for masking the k$^{th}$ progression of the progressive image, which controls the quality of the resulting masked image per the preference of either the website proprietor or the client, with the level of quality decreasing with increasing value of the progression level k, wherein the mask parameters are in one-to-one correspondence with the progression levels of the associated progressively-encoded image;

BackgroundPixelValue(i,j) the value of the image pixel at location (i,j) that would otherwise be displayed, absent a display of the progressive image. For example, wherever an image is displayed, typically there is some default value of each pixel (i,j) on the display in that location before even the first, lowest quality image is displayed. For example, a webpage may have a default background color of white before anything is actually displayed from the progressive image. Accordingly, BackgroundPixelValue(i,j) is the value that the pixel would have had prior to displaying the corresponding pixel of the first progression of the progressive image.

T(α$^k$) is a transparency level ranging in value between 0 and 1, with 0 providing for a fully opaque image over the corresponding associated BackgroundPixelValue(i,j), and 1 providing for a fully transparent image over the corresponding associated BackgroundPixelValue(i,j), wherein the transparency level T(α$^k$) is dependent upon the value of the mask parameter α$^k$, i.e. dependent upon the level of quality of the associated progressive image. For example, in one set of embodiments, the transparency level T(α$^k$) decreases with increasing image quality, i.e. with increasing value of mask parameter α$^k$, the latter of which increases with decreasing value of the progression level k, so that the initial image of the progression of images is most transparent, and the final image of the progression of images is least transparent;

InputPixelValue(i, j, k) is the tonal value of a given image pixel at pixel location (i, j) of the kth progression of the associated progressive image;

OutputPixelValue(i, j, k) is the transformed tonal value of the corresponding pixel at pixel location (i, j) the kth progression of the associated masked progressive image, wherein in all cases the OutputPixelValue(i, j, k) is clamped between 0 and the maximum range of tonal value;

HalfMax is one half the maximum of the range of tonal values, for example 255 as a maximum value for an 8 bit tonal value;

Bias(α$^k$) is an amount to shift the resulting tonal values, thereby increasing or decreasing overall image brightness, which may generally be dependent upon the value of the mask parameter $\alpha^k$, i.e. dependent upon the level of quality of the associated progressive image; and $\gamma(\alpha^k)$ is a compression factor that ranges in value between 0 and 1, wherein a value of 1 provides for no compression and a value of 0 provides for complete compression, thereby reducing image contrast, and the value of the compression factor $\gamma(\alpha^k)$ may generally be dependent upon the value of the mask parameter $\alpha^k$, i.e. dependent upon the level of quality of the associated progressive image. For example, in one set of embodiments, the value of the compression factor $\gamma(\alpha^k)$ increases with increasing image quality, i.e. with increasing value of mask parameter $\alpha^k$, the latter of which increases with decreasing value of the progression level k, so that the amount of compression decreases with increasing image quality.

For example, the transparency level $T(\alpha^k)$, bias($\alpha^k$), and compression factor $\gamma(\alpha^k)$ parameters of the mask filter 28 may determined by either the website proprietor/owner or the client/user, as a function of, or for discrete levels of, the mask parameter $\alpha^k$ measure of image quality, so as to provide for subjectively optimizing the presentation of progressive images. More particularly, these three parameters $T(\alpha^k)$, bias($\alpha^k$), $\gamma(\alpha^k)$ ultimately impact the visibility of the spatial detail of the image and therefore can be tuned to mask the perceived low quality of initial and intermediate images of a progressively-encoded image, so that the evolving image is perceived as one of high quality notwithstanding the obscuration of the initial and intermediate images by the mask filter 28.

It should be understood that the mask parameter $\alpha^k$ can be either a singular value as described hereinabove—with the other parameters $T(\alpha^k)$, bias($\alpha^k$), $\gamma(\alpha^k)$ dependent thereupon—or may be an array or set of parameters, for example, individual values of the transparency level $T^k$, bias$^k$, compression factor $\gamma^k$, or one or more other imaging parameters, for example, color balance or value.

Figure 2:
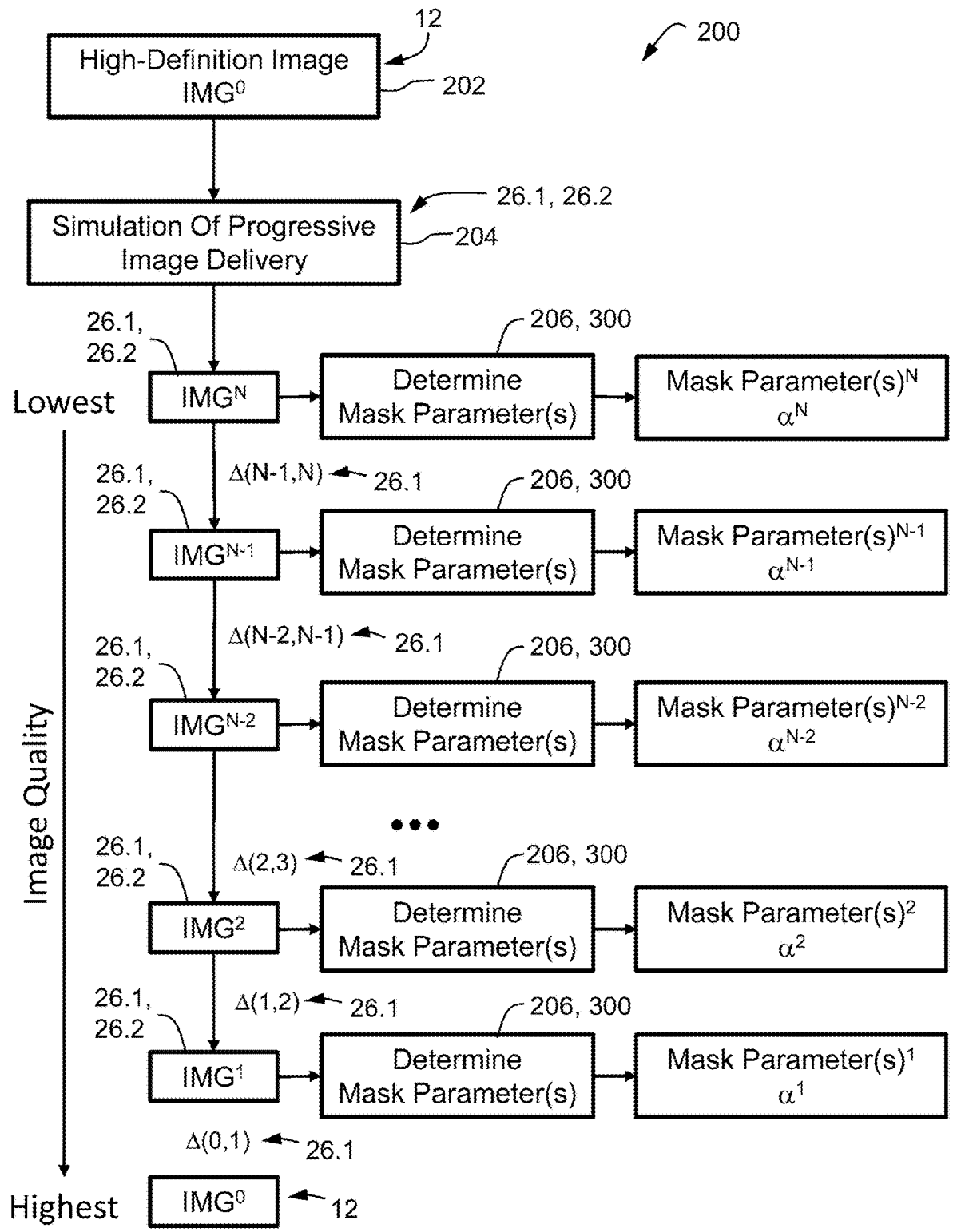
FIG. 2 illustrates a process for creating the filter masks for each of the intermediate images, masked versions of which are progressively displayed when progressively displaying the associated high-definition image in accordance with the image processing system illustrated in FIG. 1.
Figure 3:
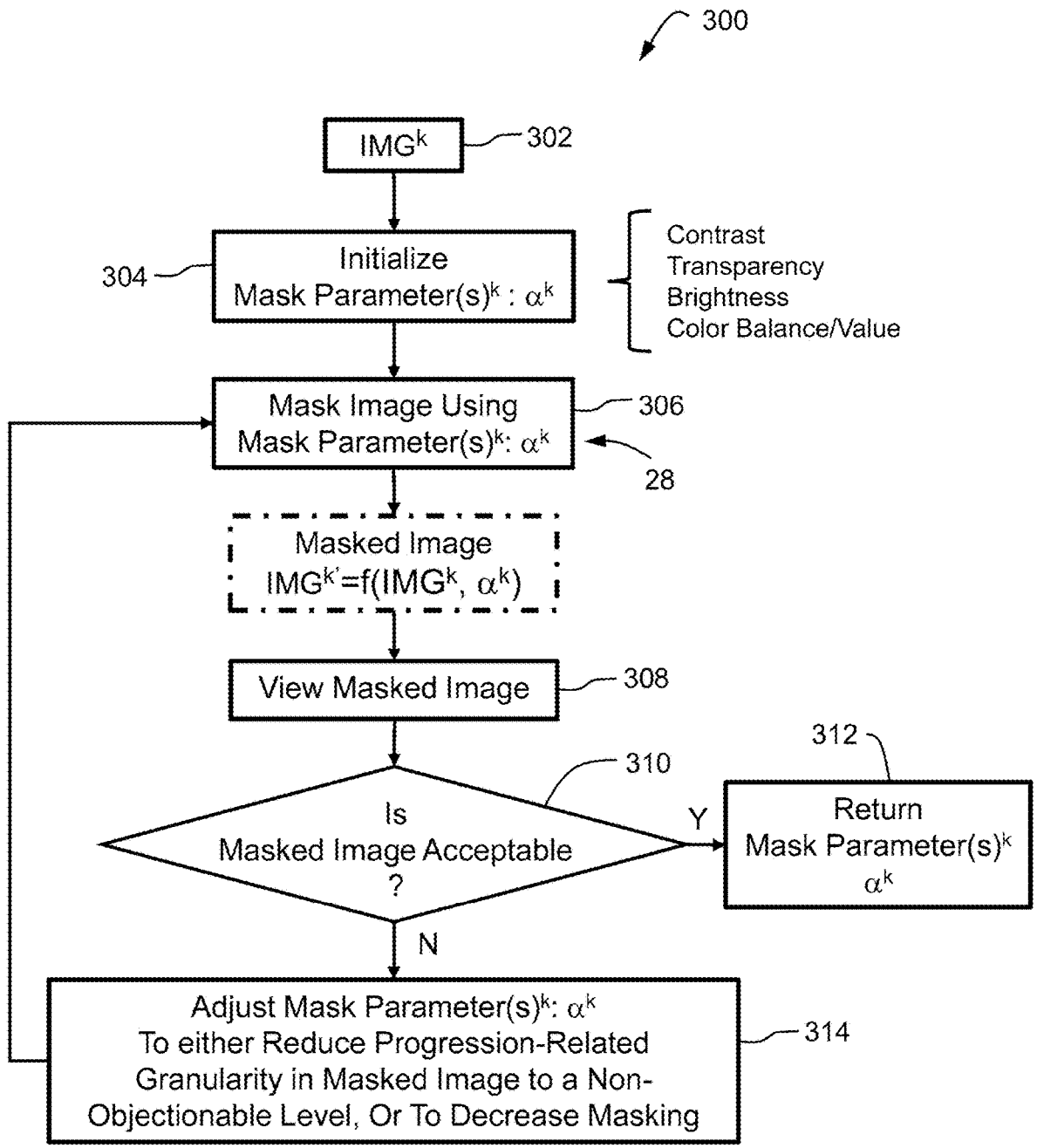
FIG. 3 illustrates a process for determining a particular associated filter-mask parameter for a corresponding particular intermediate image, in support of the process illustrated in FIG. 2.

Referring to FIGS. 2 and 3, the mask parameters $\alpha^N$, $\alpha^{N-1}, \ldots, \alpha^2, \alpha^1$ may be manually set by the user 24 by simulating the progressive delivery of the high-definition image 12, IMG$^0$, and then, for each level of progression, determining the associated mask parameters $\alpha^N$, $\alpha^{N-1}, \ldots, \alpha^2, \alpha^1$ of an associated mask filter or masking algorithm as necessary to sufficiently reduce or obscure progression related granularity in the resulting masked image.

More particularly, referring to FIG. 2, the mask-filter design process 200 commences in step (202) with receipt of a high-definition image 12, IMG$^0$ to be used as a basis for establishing the associated mask parameters $\alpha^N$, $\alpha^{N-1}, \ldots, \alpha^2, \alpha^1$ of the mask filter 28. Then, in step (204), the associated progressive imaging process 26, 26.1, 26.2—corresponding to what will ultimately be used by the webpage 16 to progressively transform the image high-definition image 12, IMG$^0$, and used for the display thereof by the internet web browser 22 on the client internet-connected receiving device 20—is simulated to provide for generating the plurality of associated lower-quality progressive images IMG$^N$, image IMG$^{N-1}$, image IMG$^{N-2}, \ldots,$ image IMG$^2$, image IMG$^1$ associated with the high-definition image 12, IMG$^0$. Then, in step (206), for each of the lower-quality progressive images IMG$^N$, image IMG$^{N-1}$, image IMG$^{N-2}, \ldots,$ image IMG$^2$, image IMG$^1$, the corresponding associated mask parameter $\alpha^N$, $\alpha^{N-1}$, $\alpha^{N-2}, \ldots, \alpha^2, \alpha^1$ is determined by an associated mask-parameter determination process 300, which, referring to FIG. 3, commences in step (302) with receipt of the particular lower-quality progressive image IMG$^k$ for which the associated mask parameter $\alpha^k$ is to be determined. Then, in step (304), the associated mask parameter $\alpha^k$—or mask parameters $\alpha^k$ for the case of $\alpha^k$ being an array of mask parameters—are initialized to an initial value, for example, a nominal value or set of values for the lowest-quality progressive images IMG$^N$, or the previously-determined value(s) $\alpha^{k+1}$ for subsequent lower-quality progressive images IMG$^{k<N}$. Then, in step (306), the lower-quality progressive image IMG$^k$ is masked by the mask filter 28, for example, in accordance with equations 1 and 2, so as to generate an associated masked lower-quality progressive image IMG$^{k'}$, which, in step (308), is viewed—for example, by the website proprietor 14—and subjectively judged in step (310) by the viewer to assess whether the associated progression-related granularity that might be visible in the masked lower-quality progressive image IMG$^{k'}$ is objectionable, or, at the other extreme, the masking has been excessive. If the resulting masked lower-quality progressive image IMG$^{k'}$ has an acceptable appearance, then, in step (312), the mask parameter $\alpha^k$, or mask parameters $\alpha^k$, are returned to the mask-filter design process 200, which then proceeds to the next lower-quality progressive image IMG$^{k-1}$. Otherwise, from step (310), then, in step (314), the mask parameter $\alpha^k$, or mask parameters $\alpha^k$, is/are either increased in value to further reduce progression-related granularity in the masked lower-quality progressive image IMG$^{k'}$, or reduced in value to decrease the amount of masking, and therefor provide for displaying greater detail. Then, the mask-parameter determination process 300 is repeated beginning with step (306), until the acceptable mask parameter $\alpha^k$, or mask parameters $\alpha^k$, is/are returned in step (312).

For example, in accordance with a first set of embodiments, the mask parameters $\alpha^N$, $\alpha^{N-1}, \ldots, \alpha^2, \alpha^1$ provide for setting the contrast and transparency (similarly—opacity) of the masked image, for example, via the above-described compression factor $\gamma(\alpha^k)$, and transparency level $T(\alpha^k)$, respectively. These adjustments for each level of progressive image quality are determined using example images of a particular progressive scheme because the perceived quality of low-quality images is dependent on that scheme. However, such determination may be done visually, with masking to the extent that produces a result which appears as the high-quality image masked by a realistic medium such as a fog or low light level. In accordance with one set of embodiments, the values of the associated mask parameters $\alpha^N$, $\alpha^{N-1}, \ldots, \alpha^2, \alpha^1$ are currently tailored for a particular progressive imaging process 26, 26.1, 26.2, regardless of the ultimate content of the sent images, and these mask parameters $\alpha^N$, $\alpha^{N-1}, \ldots, \alpha^2, \alpha^1$ are then later sent to the client internet-connected receiving device 20 to be automatically applied to the associated progressively-displayed images, for example, through instructions in the HTML code which controls how the webpage 16 is to be drawn/presented.

Referring again to FIG. 1, in accordance with one set of embodiments, the mask-filter design process 200 is operated by the website proprietor 14 on the server device 18/internet webserver 18' after transmitting the high-definition image 12, IMG$^0$ provided thereto, whereby the associated mask parameters $\alpha^N$, $\alpha^{N-1}$, $\alpha^{N-2}, \ldots, \alpha^2, \alpha^1$ are then configured on the server device 18/internet webserver 18'. Alternatively, in accordance with another set of embodiments, the mask-filter design process 200 could be operated by the website proprietor 14 as an image processing application on a separate computer system, for example, on an image server device 30 such as a secondary internet webserver 30', which then transmits the resulting mask parameters $\alpha^N$, $\alpha^{N-1}$, $\alpha^{N-2}, \ldots, \alpha^2, \alpha^1$ to the primary internet webserver 18' on the primary server device 18.

Figures 4A, 4B:
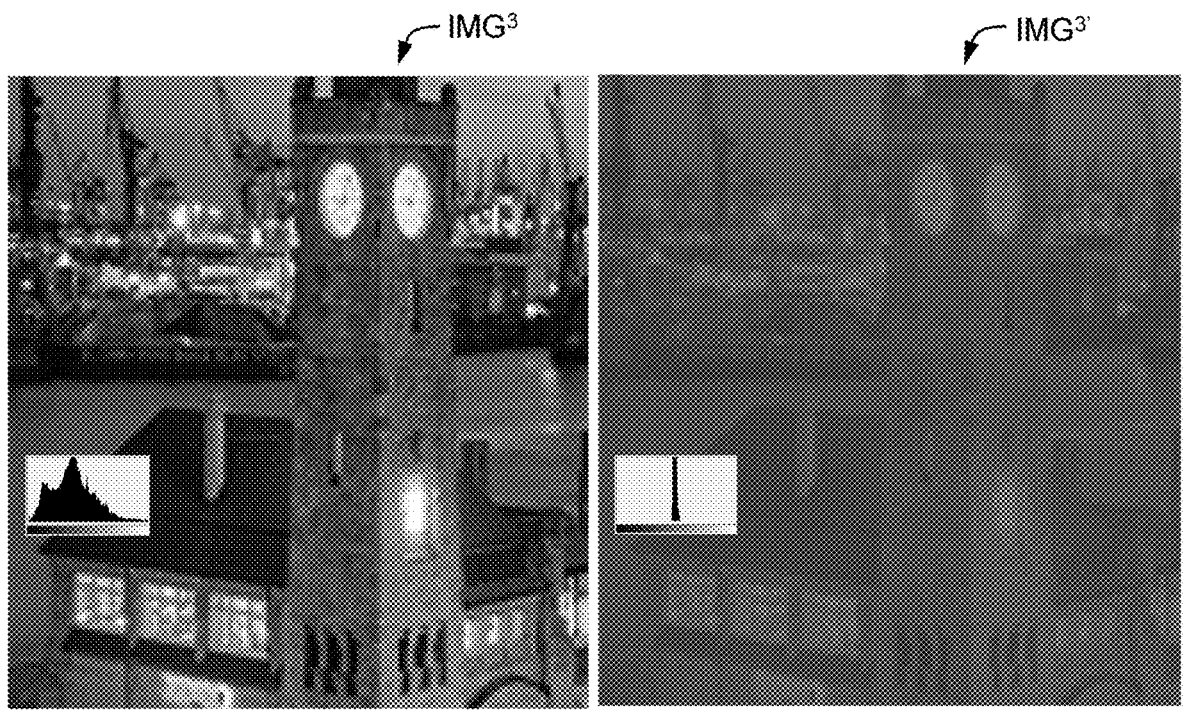
FIG. 4a illustrates a first-progression, first-quality intermediate image associated with the progressive display of the high-definition image illustrated in FIG. 4c, together with a histogram of associated image pixel values for the entire first-quality intermediate image.
FIG. 4b illustrates a masked version of the first-progression, first-quality intermediate image illustrated in FIG. 4a, together with a histogram of associated image pixel values for the entire masked first-progression, first-quality intermediate image.
Figures 4C, 4D:
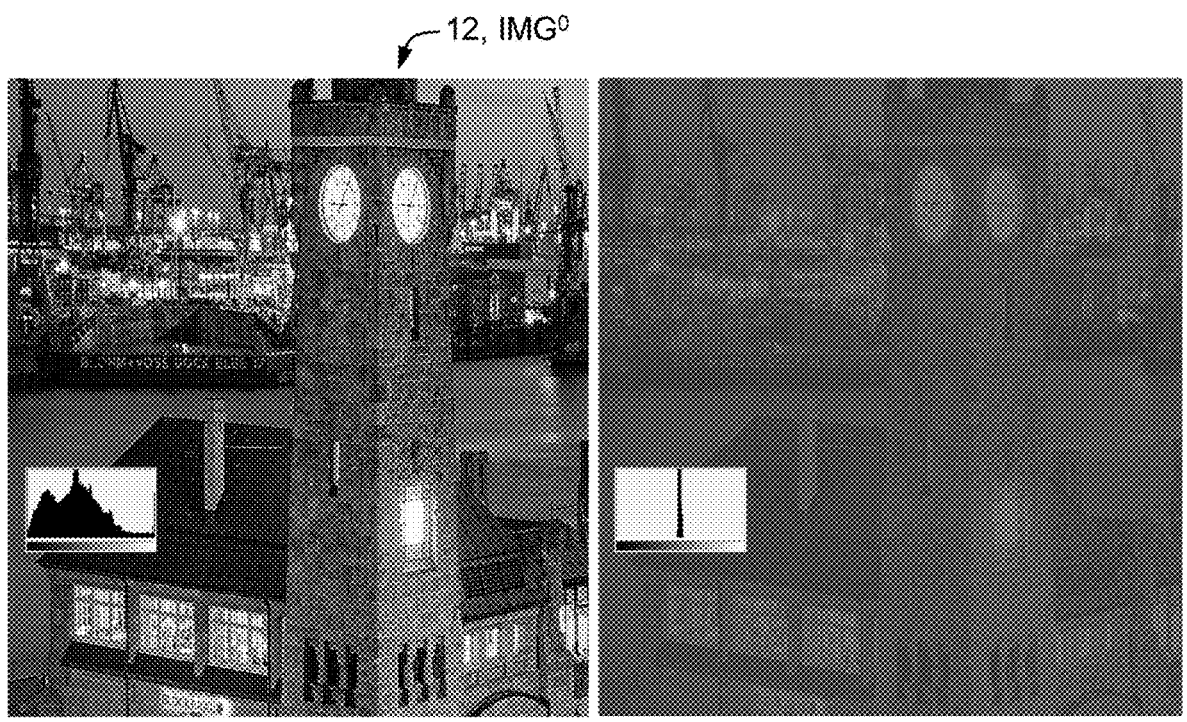
FIG. 4c illustrates, for purposes of comparison, the high-definition image from which the first-progression, first-quality intermediate image illustrated in FIG. 4a is derived, together with a histogram of associated image pixel values for the entire high-definition image.
FIG. 4d illustrates a masked version of the high-definition image illustrated in FIG. 4c, together with a histogram of associated image pixel values for the entire masked high-definition image, wherein the associated filter-mask parameter—associated with the associated histogram—was selected so that the corresponding images of FIGS. 4b and 4d had similar appearance.
Figures 7A, 7B:
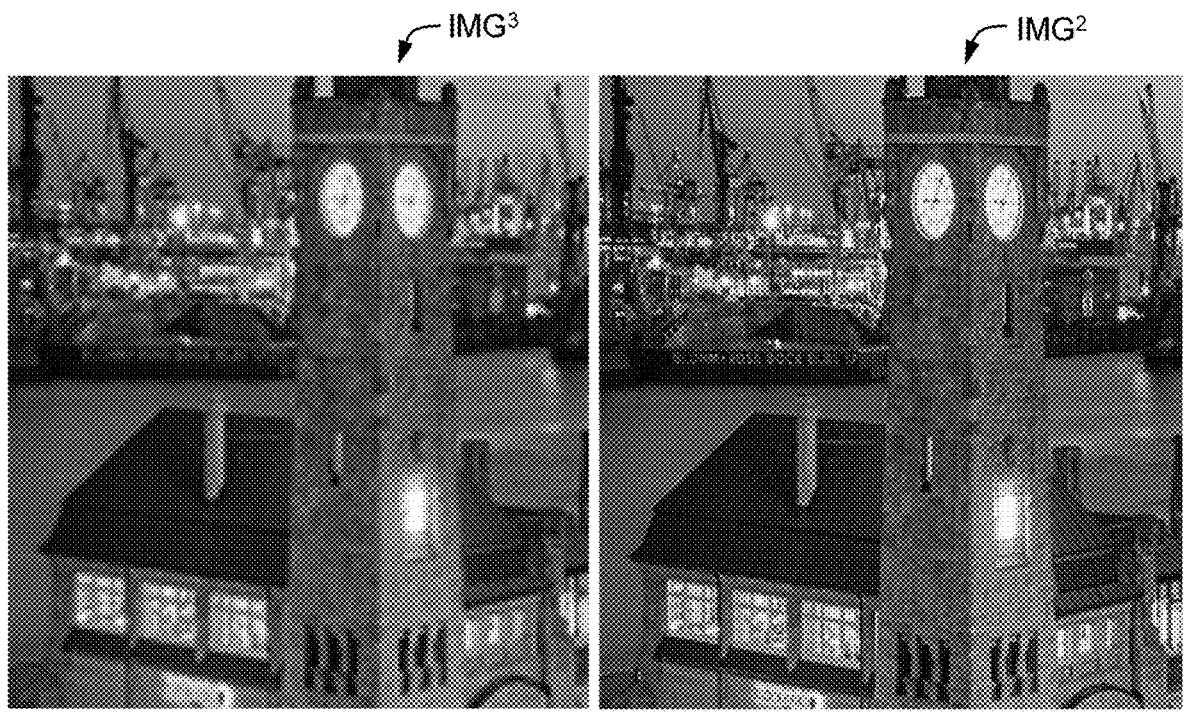
FIG. 7a is a copy of the first-progression, first-quality intermediate image illustrated in FIG. 4a, for purposes of comparison with the intermediate images illustrated in FIGS. 5a/7b and 6a/7c, and for comparison with the high-definition image illustrated in FIGS. 4c, 5c, 6c and 7d.
FIG. 7b is a copy of the second-progression, second-quality intermediate image illustrated in FIG. 5a, for purposes of comparison with the intermediate images illustrated in FIGS. 4a/7a and 6a/7c, and for comparison with the high-definition image illustrated in FIGS. 4c, 5c, 6c and 7d.
Figures 7C, 7D:
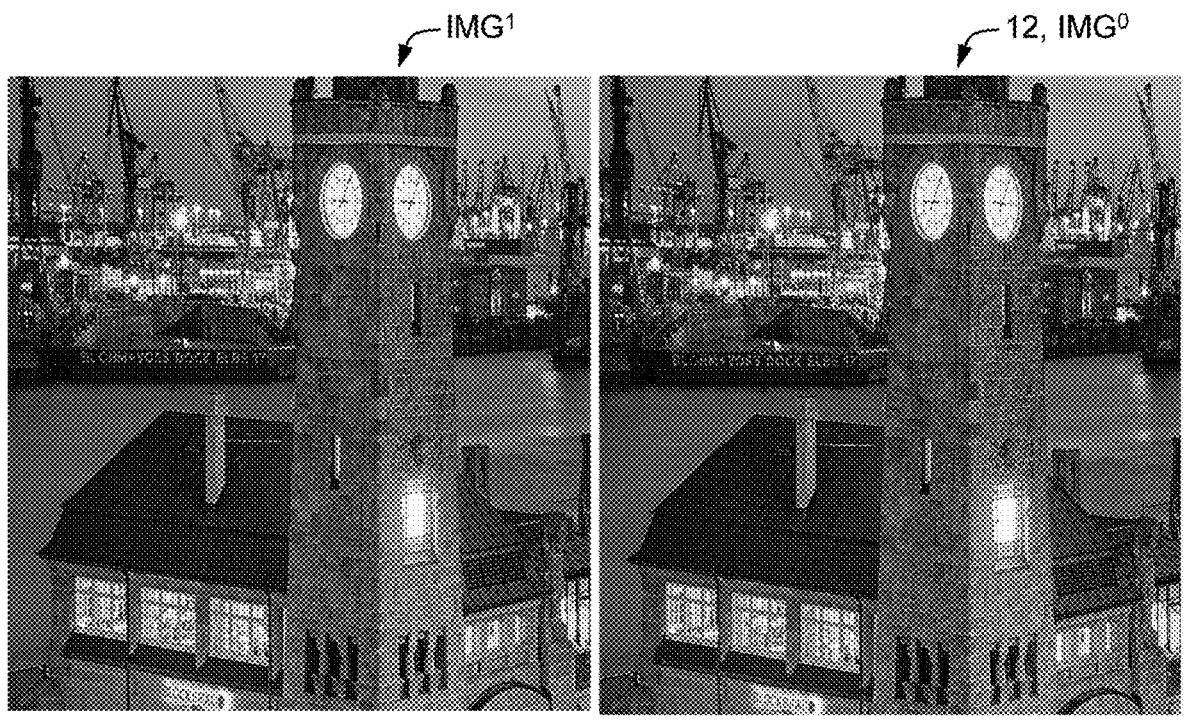
FIG. 7c is a copy of the third-progression, third-quality intermediate image illustrated in FIG. 6a, for purposes of comparison with the intermediate images illustrated in FIGS. 4a/7a and 5a/7b, and for comparison with the high-definition image illustrated in FIGS. 4c, 5c, 6c and 7d.
FIG. 7d a copy of the high-definition image—the same as illustrated in FIGS. 4c, 5c and 6c—from which the intermediate images illustrated in FIGS. 7a-7c were derived, for purposes of comparison therewith.
Figures 8A, 8B:
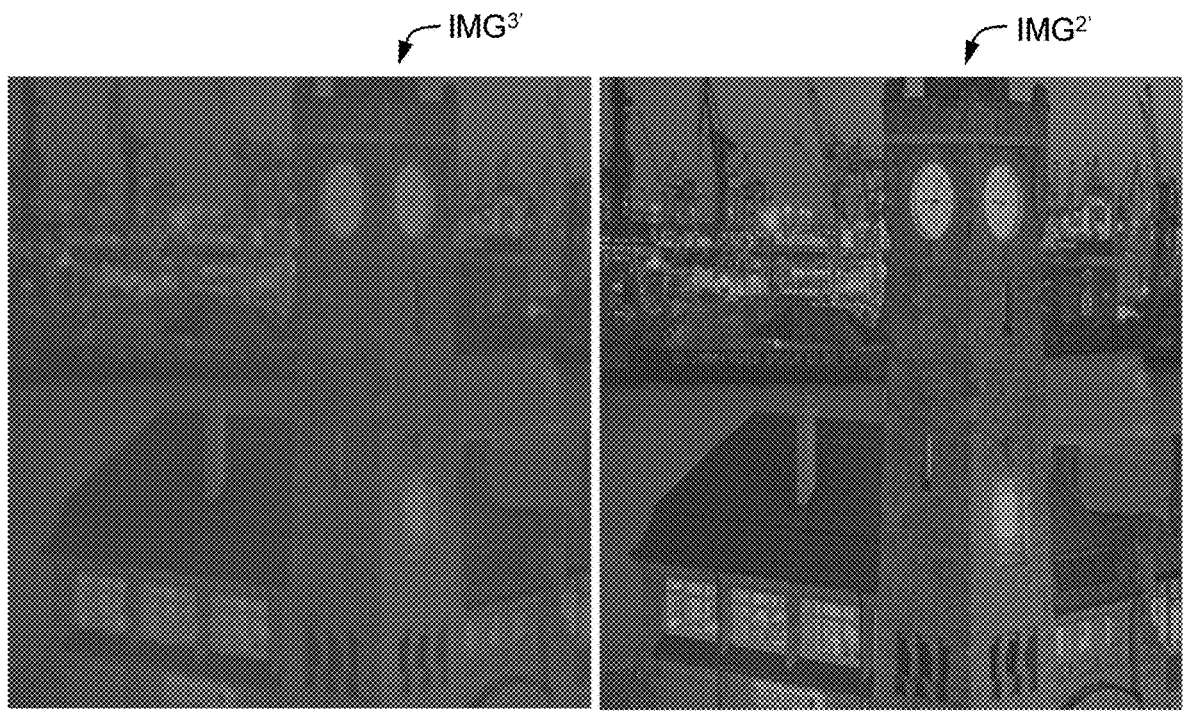
FIG. 8a is a copy of the masked first-progression, first-quality intermediate image illustrated in FIG. 4b, for purposes of comparison with the masked intermediate images illustrated in FIGS. 5b/8b and 6b/8c, and for comparison with the high-definition image illustrated in FIGS. 4c, 5c, 6c, 7d and 8d.
FIG. 8b is a copy of the masked second-progression, second-quality intermediate image illustrated in FIG. 5b, for purposes of comparison with the masked intermediate images illustrated in FIGS. 4b/8a and 6b/8c, and for comparison with the high-definition image illustrated in FIGS. 4c, 5c, 6c, 7d and 8d.
Figures 8C, 8D:
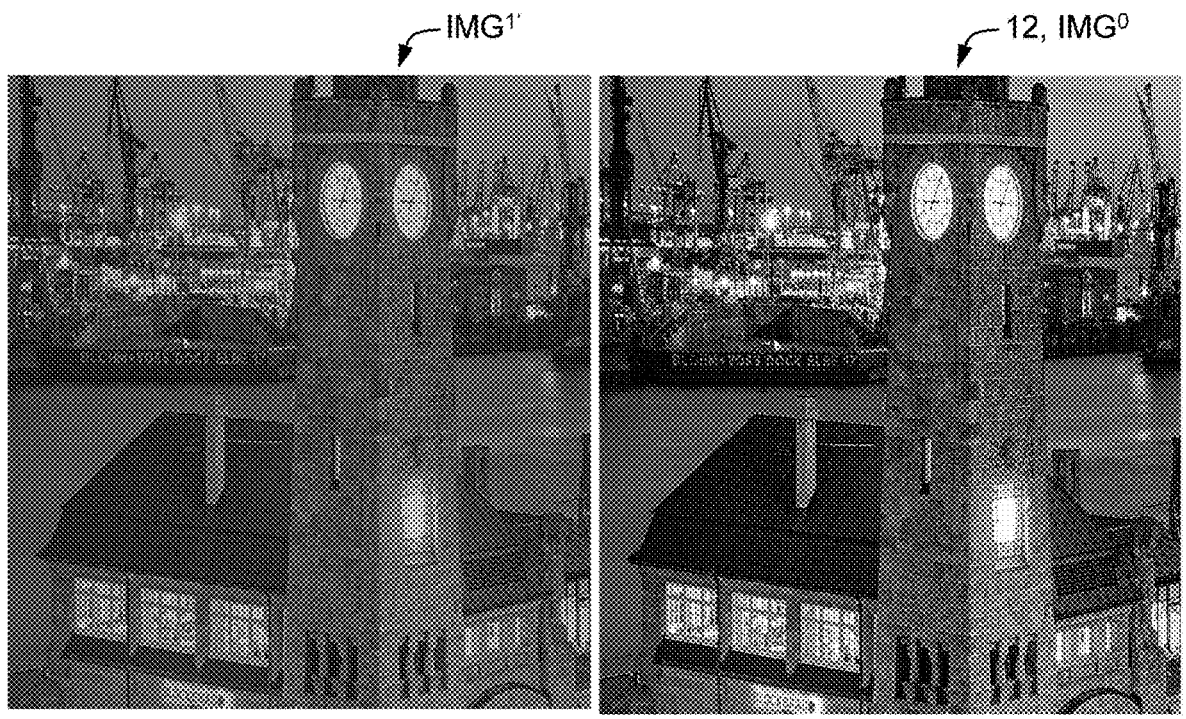
FIG. 8c is a copy of the masked third-progression, third-quality intermediate image illustrated in FIG. 6b, for purposes of comparison with the masked intermediate images illustrated in FIGS. 4b/8a and 5b/8b, and for comparison with the high-definition image illustrated in FIGS. 4c, 5c, 6c, 7d and 8d.
FIG. 8d a copy of the high-definition image—the same as illustrated in FIGS. 4c, 5c, 6c, 7d and 8d—from which the masked intermediate images illustrated in FIGS. 8a-8c were derived, for purposes of comparison therewith.

The effect of the mask filter 28 is illustrated in FIGS. 4a-c, 5a-c and 6a-c for three lower-quality images $IMG^3$, $IMG^2$, $IMG^1$ of progressively higher spatial quality, shown in FIGS. 4a, 5a and 6a respectively, that are sequentially displayed in advance of a final, relatively-higher spatial quality image $IMG^0$ shown in FIGS. 4c, 5c and 6c, all exemplifying the associated progressive-imaging process 26, 26.1, 26.2. FIGS. 4b, 5b and 6b illustrate corresponding masked lower-quality images $IMG^{3'}$, $IMG^{2'}$, $IMG^{1'}$ resulting from the application of mask filter 28 of the image processing system 10 to mask visible spatial detail of artifacts in the lower-quality images $IMG^3$, $IMG^2$, $IMG^1$ of FIGS. 4a, 5a and 6a, respectively, through a reduction in contrast resulting in a compression of the image histogram shown as an inset in each of FIGS. 4a-b, 5a-b and 6a-b. The amount of the associated image compression is determined so as to decrease the visibility of spatial detail in the lower-quality images $IMG^3$, $IMG^2$, $IMG^1$ to a level which not only obscures the appearance of low spatial quality in the lower-quality images $IMG^3$, $IMG^2$, $IMG^1$ but also provide for corresponding resulting masked lower-quality images $IMG^{3'}$, $IMG^{2'}$, $IMG^{1'}$ that each reasonably appear as a final high-resolution image obscured by a similar, though not necessarily identical, contrast reduction, or masking, thereof, as illustrated in FIGS. 4d, 5d and 6d, respectively. Accordingly, in one set of embodiments, the mask parameters $\alpha^N, \alpha_{N-1}, \ldots, \alpha^2, \alpha^1$ of the mask filter 28 are determined so that the masked lower-quality images $IMG^{3'}$, $IMG^{2'}$, $IMG^{1'}$ have an appearance that is similar to the similarly-masked high-definition image 12, $IMG^0$, so that the progression-related artifacts in the lower-quality images $IMG^3$, $IMG^2$, $IMG^1$ are obscured, whereby the masked lower-quality images $IMG^{3'}$, $IMG^{2'}$, $IMG^{1'}$ are substantially indistinguishable from a similarly masked high-definition image 12, $IMG^0$, leaving an impression of the object in the high-definition image 12, $IMG^0$ emerging from a fog as the image progression of the associated progressively-displayed high-definition image 12, $IMG^0$ progresses. The associated amount of masking (e.g. contrast reduction) and the actual algorithm for masking each progressive initial image is determined in advance; stored as masking parameters on the server device 18; and thereafter sent to the client internet-connected receiving device 20 with instructions regarding their application prior to, or simultaneous with, the sending of each progressively-higher-quality image so that such masking can be applied, and resulting intermediate images thereafter displayed, by the client internet-connected receiving device 20. For example, such instructions and parameters, including the masking algorithms themselves, may be included as part of the Hypertext Markup Language (HTML) of a webpage 16 provided by a internet webserver 18', to be processed by an internet web browser 22 on a client internet-connected device 22. Note that FIGS. 4d, 5d and 6d are not necessarily intended as the visual goal of the masking result of FIGS. 4b, 5b and 6b, respectively, but simply to illustrate that masking of the lower-quality images may be easily interpreted as a realistic obscuration of the spatial detail inherent in the high-quality, high-definition image 12, $IMG^0$.

Whereas FIGS. 4a-b, 5a-b and 6a-b illustrate the processing and display of each progressively higher quality initial image, the comparison between a progressive image display with and without masking is more easily seen by rearranging the images of FIGS. 4a-c, 5a-c and 6a-c into FIGS. 7a-d and 8a-d, wherein the progression from low to high image quality without masking is shown in FIGS. 7a through 7d, and the progression from low to high image quality with masking is shown in FIGS. 8a through 8d. Such comparison illustrates that whereas the unmasked versions clearly shows initial images of unrealistically low quality, the progressive, masked images provide a visual suppression of the low spatial quality of such images while providing an impression of an inherently high-resolution image gradually being revealed in a more natural, realistic way.

For example, in the embodiments illustrated in FIGS. 4b, 4d, 5b, 5d, 6b, 6d and 8a-c, the masking was originally performed using Corel Photo-Paint version X6 with the menu drop down item "Adjust", by selecting "Brightness/Contrast/Intensity" to bring up a tool window with brightness, contrast and intensity, each having a slider that provides for selecting a value in the range of −100 to 100, with 0 being the unmodified setting, using the following, visually-determined settings: FIG. 4b: Contrast=−93; FIG. 5b: Contrast=−88; and FIG. 6b: Contrast=−30. The histograms illustrated in FIGS. 4a-d, 5a-d and 6a-d correspond to the correspond to the original images presented in U.S. Provisional Application Ser. No. 62/669,296 filed on 9 May 2018. However, the corresponding masked images of FIGS. 4b, 4d, 5b, 5d, 6b, 6d and 8a-c of the instant application were generated using Adobe Photoshop Version 12.0×32 using respective Legacy Brightness/Contrast levels of −80, −60 and −40, respectively, within an available range of +/−100, so as to provide for printable images that better illustrates the masking process.

Referring again to FIG. 1, if the image processing system 10, 10.1 utilizes the first-aspect progressive imaging process 26, 26.1 to progressively transform and transmit the high-definition image 12, $IMG^0$, then the base image $IMG^N$ is initially transmitted to the client internet-connected receiving device 20, followed by image supplements $\Delta(N-1,N)$, $\Delta(N-2,N-1)$, $\Delta(2,3)$, $\Delta(1,2)$, $\Delta(0-,1)$ interleaved with the associated mask parameters $\alpha^N, \alpha^{N-1}, \alpha^{N-2}, \ldots, \alpha^2, \alpha^1$, wherein the image supplements $\Delta(N-1,N)$, $\Delta(N-2,N-1), \ldots, \Delta(2,3), \Delta(1,2), \Delta(0-,1)$ provide for progressively reconstructing progressively-higher-resolution images, beginning with the base image $IMG^N$, and culminating with the high-definition image 12, $IMG^0$. Each progressively-encoded lower-quality progressive image $IMG^k$ leading up to the high-definition image 12, $IMG^0$ is filtered by a mask filter 28 on the client internet-connected receiving device 20 using the associated mask parameters $\alpha^k$ to generate an associated masked lower-quality progressive image $IMG^{k'}$ that is displayed on the client internet-connected receiving device 20, either as determined by the client internet-connected receiving device 20, or responsive to instructions from the server device 18, for example via software encoded in a webpage 16 to be processed by an internet web browser 22, for the display of an intermediate image while the actual, unmasked, lower-quality progressive images $IMG^k$ (or the associated data thereof) are used for progressively reconstructing the lower-quality progressive images $IMG^k$ and eventually the high-definition image 12, $IMG^0$. For example, a progressively encoded JPEG (Joint Photographic Experts Group) image provides progressively higher quality intermediate renderings of an image as data is received and decoded prior to presentation of the final high-definition image 12, $IMG^0$. Therefore, in accordance with the first aspect of the image processing system 10, 10.1, the client internet-connected receiving device 20 uses the mask filters 18, or associated masking algorithms, only for the display of the masked lower-quality progressive image $IMG^{k'}$, whereas the unmasked lower-quality progressive images $IMG^k$ are successively preserved in support of the progressive JPEG reconstruction process.

Figure 9:
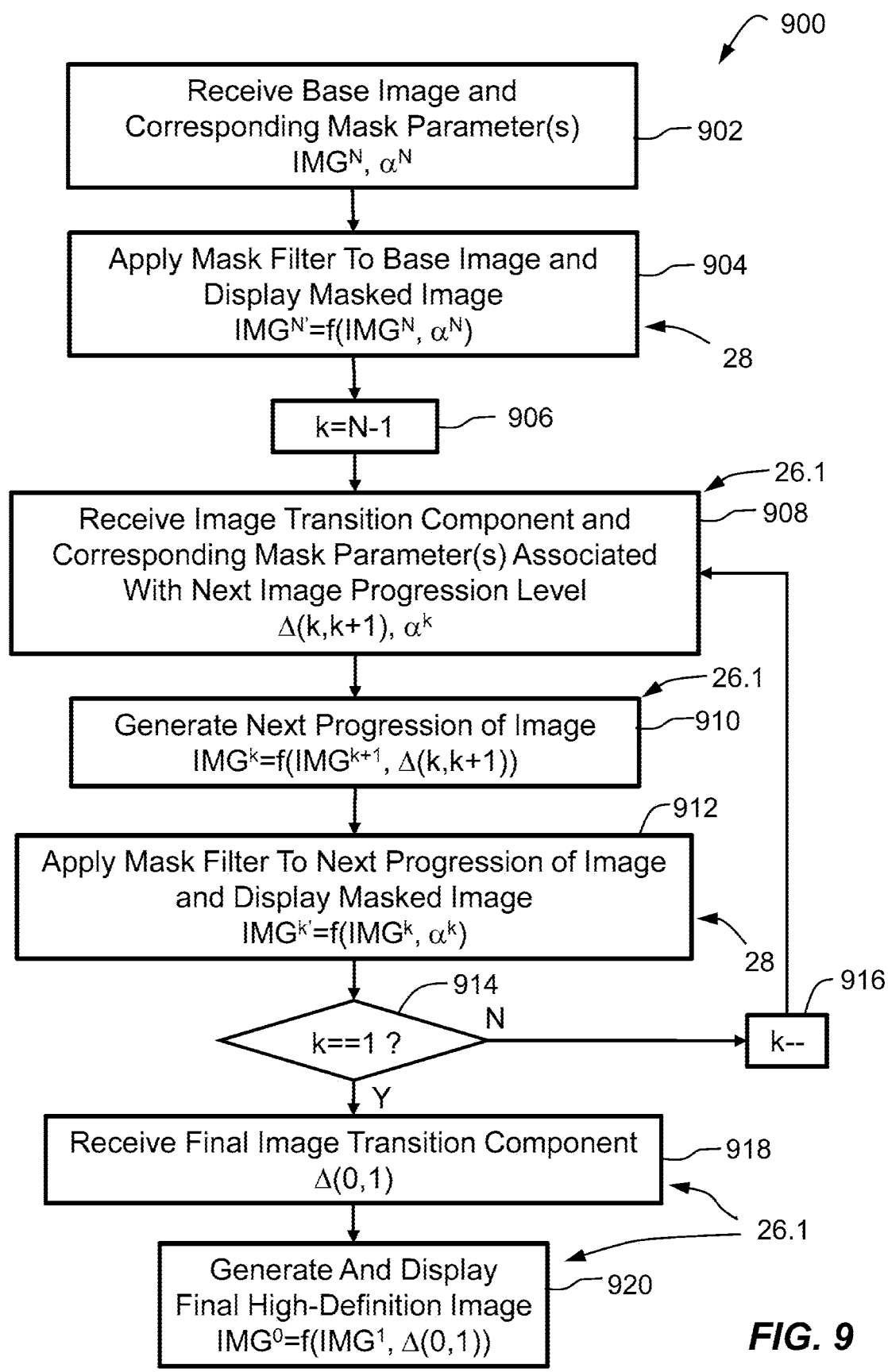
FIG. 9 illustrates a first aspect of a process for progressively receiving and forming intermediate and final images of a progressively-displayed high-definition image, and for applying associated mask filters to the intermediate images either prior to, or during, the display thereof, in accordance with the first aspect of the image processing system illustrated in FIG. 1.

In accordance with one set of embodiments of the first aspect image processing system 10, 10.1, given the particular progressive image display algorithm to be used, the number of levels of image progression (and corresponding number of intermediate images), and the selection of corresponding associated values for the mask parameters $\alpha^N$, $\alpha^{N-1}$, ..., $\alpha^2$, $\alpha^1$, the progressively-improved images are generated, masked and displayed on the client internet-connected receiving device 20 in accordance with the process illustrated in FIG. 9, culminating with an unmasked display of the high-definition image 12, $IMG^0$.

More particularly, referring to FIG. 9, in accordance with a set of embodiments of the first-aspect image processing system 10, 10.1 incorporating a first-aspect progressive imaging process 26, 26.1, a progressive image-masking and display process 900 operative on the client internet-connected receiving device 20 provides for receiving, from the server device 18, a base image $IMG^N$, a plurality of associated image supplements $\Delta(N-1,N)$, $\Delta(N-2,N-1)$, $\Delta(2,3)$, $\Delta(1,2)$, $\Delta(0-,1)$, and a plurality of associated mask parameters $\alpha^N$, $\alpha^{N-1}$, $\alpha^{N-2}$, ..., $\alpha^2$, $\alpha^1$ interleaved therewith, and then generating therefrom, and displaying, a corresponding plurality of masked lower-quality progressive images $IMG^{N'}$, $IMG^{N-1'}$, $IMG^{N-2'}$, ..., $IMG^{2'}$, $IMG^{1'}$—with progressively increasing quality—culminating with an unmasked display of the high-definition image 12, $IMG^0$. The progressive image-masking process 900 commences in step (902) with receipt of the base image $IMG^N$ and the associated mask parameter $\alpha^N$, after which, in step (904), the corresponding masked lowest-quality progressive image $IMG^{N'}$ is generated by the associated mask filter 28 from the lowest-quality progressive image $IMG^N$ (i.e. the base image $IMG^N$), with an associated level of masking controlled by the value of the mask parameter $\alpha^N$, after which the resulting masked lowest-quality progressive image $IMG^{N'}$ is displayed. In embodiments for which the total number N of intermediate, lower-quality progressive images $IMG^N$ is given a priori, in step (906), a counter k may be initialized to a value of N−1 to track the number of remaining lower-quality progressive images $IMG^k$ to be processed in subsequent steps (908) through (912). Then, in step (908), the next image supplement $\Delta(k,k+1)$ and an associated mask parameter $\alpha^k$ are received form the server device 18. The image supplement $\Delta(k,k+1)$ is an image transition component that provides for generating the next lower-quality progressive image $IMG^k$ from the previous lower-quality progressive image $IMG^{k+1}$, with the former being of higher quality than the latter. Then, in step (910), the next progression lower-quality progressive image $IMG^k$ is generated responsive to both the previous lower-quality progressive image $IMG^{k+1}$ and the image supplement $\Delta(k,k+1)$, in accordance with a counterpart to the first-aspect progressive imaging process 26, 26.1 of the server device 18. Then, in step (912), the corresponding masked lower-quality progressive image $IMG^{k'}$ is generated by the associated mask filter 28 from the lower-quality progressive image $IMG^k$ using the associated mask parameter $\alpha^k$, which provides progressively less masking for the previous masked lower-quality progressive image $IMG^{k+1'}$, after which the resulting masked lower-quality progressive image $IMG^{k'}$ is displayed. Then, steps (914) and (916) respectively provide for testing and decrementing the counter k so as to provide for repeating steps (908) through (912) for each of the progressively-increasing-quality lower-quality progressive images $IMG^k$ and associated masked lower-quality progressive images $IMG^{k'}$. Then, in step (918), a final image supplement $\Delta(0,1)$ is received, from which, in step (920), the final, high-definition image 12, $IMG^0$ is generated and displayed, without masking. Alternatively, instead of using a counter k and associated steps (906), (914) and (916), the termination of repetitions of steps (908) through (912) could be controlled by a signal from the server device 18 indicating when to transition to step (918).

If, instead, the image processing system 10, 10.1 utilizes the second-aspect progressive imaging process 26, 26.2 to progressively transform and transmit the high-definition image 12, $IMG^0$, the lower-quality progressive images $IMG^k$ are each independent of one another and are each transmitted along with an associated mask parameter $\alpha^k$, the latter of which are used by an associated mask filter 28 on the client internet-connected receiving device 20 to generate the corresponding masked lower-quality progressive image $IMG^{k'}$ from the corresponding lower-quality progressive images $IMG^k$ for display on the client internet-connected receiving device 20.

Figure 10:
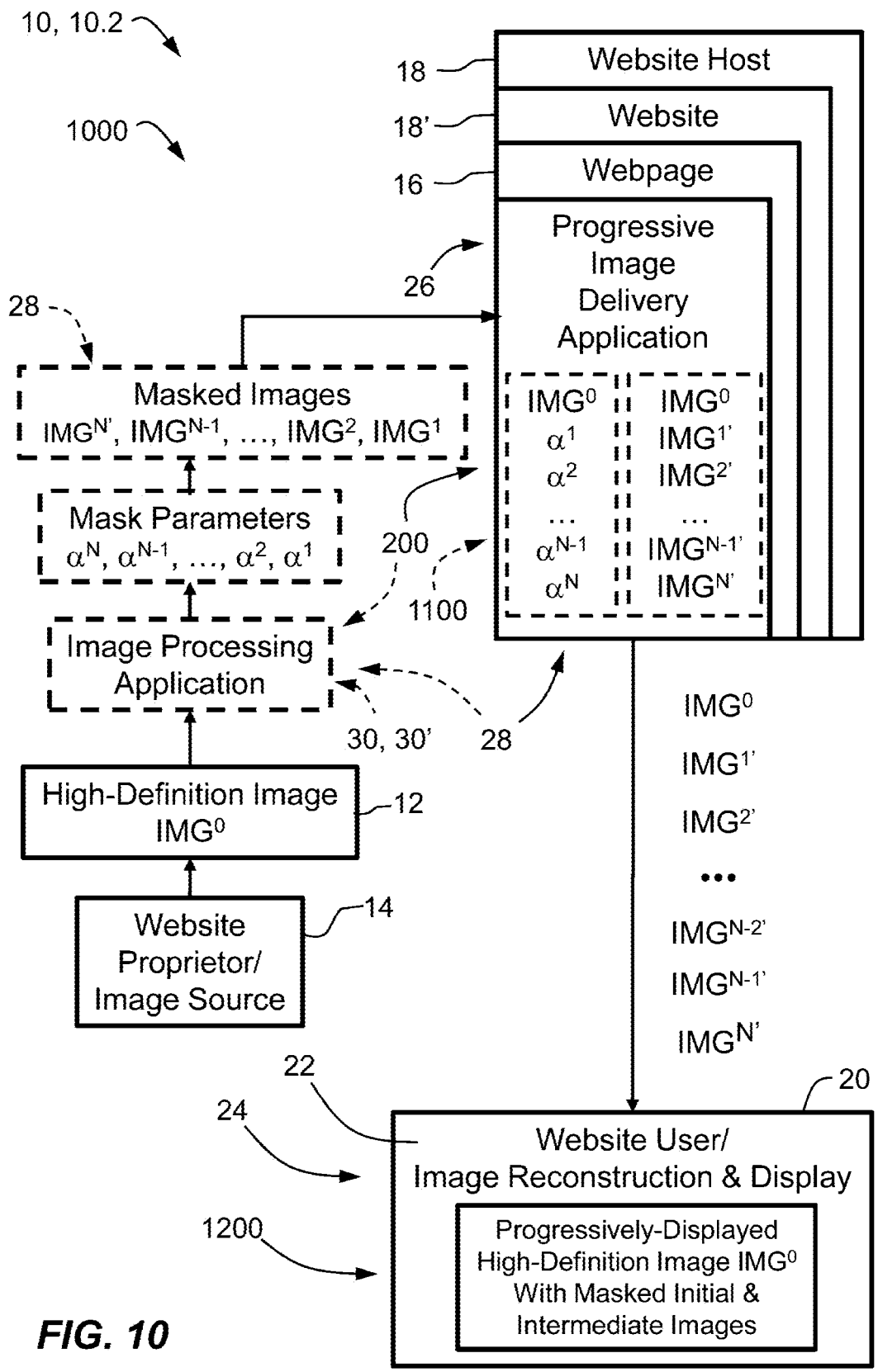
FIG. 10 illustrates a second aspect of an image processing system that provides for progressively generating and masking associated intermediate images of a progressively-displayed high-definition image so as to provide for obscuring artifacts in the associated intermediate images that are progressively displayed leading up to the display of the final high-definition image.

Referring to FIG. 10, in accordance with a second aspect 10.2 of the image processing system 10, 10.2, the masking of the lower-quality progressive images $IMG^N$, $IMG^{N-1}$, $IMG^{N-2}$, ..., $IMG^2$, $IMG^1$ is done either on the server device 18 or on an associated image server device 30, and the components of the progressive image are each transmitted from the server device 18, or the associated image server device 30, to the client internet-connected receiving device 20 as masked lower-quality progressive images $IMG^{N'}$, $IMG^{N-1'}$, $IMG^{N-2'}$, ..., $IMG^{2'}$, $IMG^{1'}$, culminating with the high-definition image 12, $IMG^0$, each of which are displayed directly by the client internet-connected receiving device 20, thereby freeing the client internet-connected receiving device 20 from further processing of the images. In accordance with one set of embodiments, the mask parameters $\alpha^N$, $\alpha^{N-1}$, $\alpha_{N-2}$, ..., $\alpha^2$, $\alpha^1$ are determined in the same manner as described hereinabove for the first-aspect image processing system 10,10.1, i.e. in accordance with the mask-filter design process 200 operating on either the server device 18 or an associated image server device 30, 30', for the particular associated progressive imaging process 26, 26.1, 26.2, except that the associated masked lower-quality progressive images $IMG^{N'}$, $IMG^{N-1'}$, $IMG^{N-2'}$, ..., $IMG^{2'}$, $IMG^{1'}$ generated in step (308) are saved for eventual transmission to the client internet-connected receiving device 20. Alternatively, the mask parameters $\alpha^N$, $\alpha^{N-1}$, $\alpha^{N-2}$, ..., $\alpha^2$, $\alpha^1$ alone may be determined by the mask-filter design process 200 on the image server device 30 and then transmitted to the server device 18 along with the high-definition image 12, $IMG^0$, the latter of which is then progressively encoded and then masked by an associated progressive image-masking process 1100 on the server device 18 for eventual transmission to the client internet-connected receiving device 20.

Figure 11:
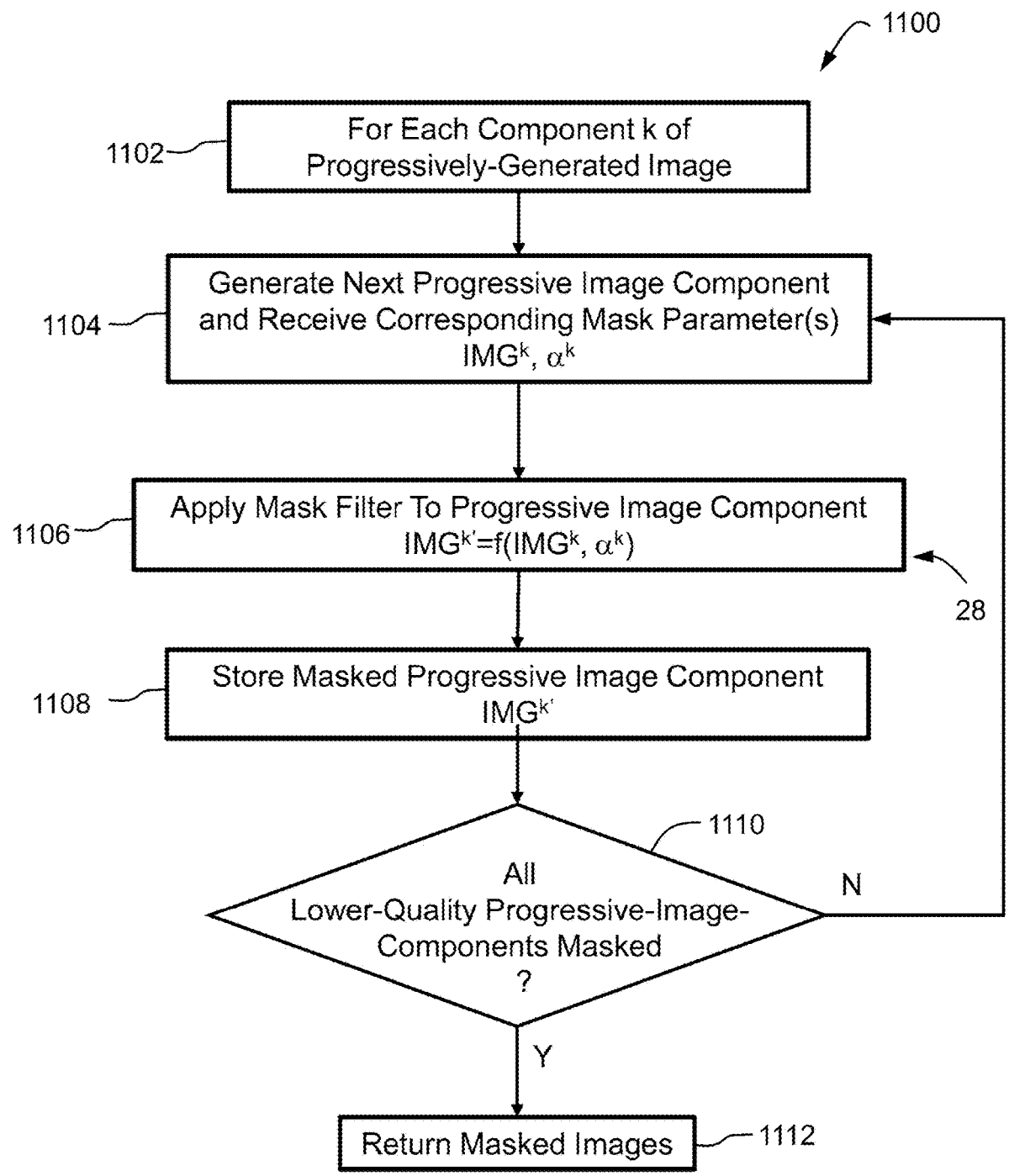
FIG. 11 illustrates a process for generating and masking progressive image components, and for storing the masked progressive image components for use by the second aspect of the image processing system.

More particularly, referring to FIG. 11, beginning with step (1102) of the progressive image-masking process 1100, for each lower-quality image component k of the associated progressively generated image, generated from the high-definition image 12, $IMG^0$ received from the website proprietor 14, in step (1104), the next progressive image component $IMG^k$ is generated by the associated progressive imaging process 26, 26.1, 26.2 and the associated mask parameter $\alpha^N$ is received from the website proprietor 14, after which, in step (1106), the corresponding masked lower-quality progressive image $IMG^{k'}$ is generated from the corresponding lower-quality progressive image $IMG^k$ by the mask filter 28 using the given value of the mask parameter $\alpha^N$, after which, in step (1108), the masked lower-quality progressive image IMG$^{k'}$ is saved for eventual transmission to the client internet-connected receiving device 20. From step (1110), steps (1104) through (1108) are repeated for each lower-quality image component k, after which, in step (1112), the masked lower-quality progressive images IMG$^{k'}$ are returned for eventual transmission to the client internet-connected receiving device 20.

Alternatively, the lower-quality progressive images IMG$^N$, IMG$^{N-1}$, IMG$^{N-2}$, ..., IMG$^2$, IMG$^1$ associated with the high-definition image 12, IMG$^0$ may be masked to lower quality place holder images before they are transmitted to a client internet-connected receiving device 20, such as a computer with an internet web browser 22, since such images are typically discarded as higher quality images become available. In such cases, due to a reduction in the image complexity as a result of such masking, such image processing will likely result in greater compression efficiency and therefore faster transmission, without requiring subsequent masking by the client internet-connected receiving device 20.

Figure 12:
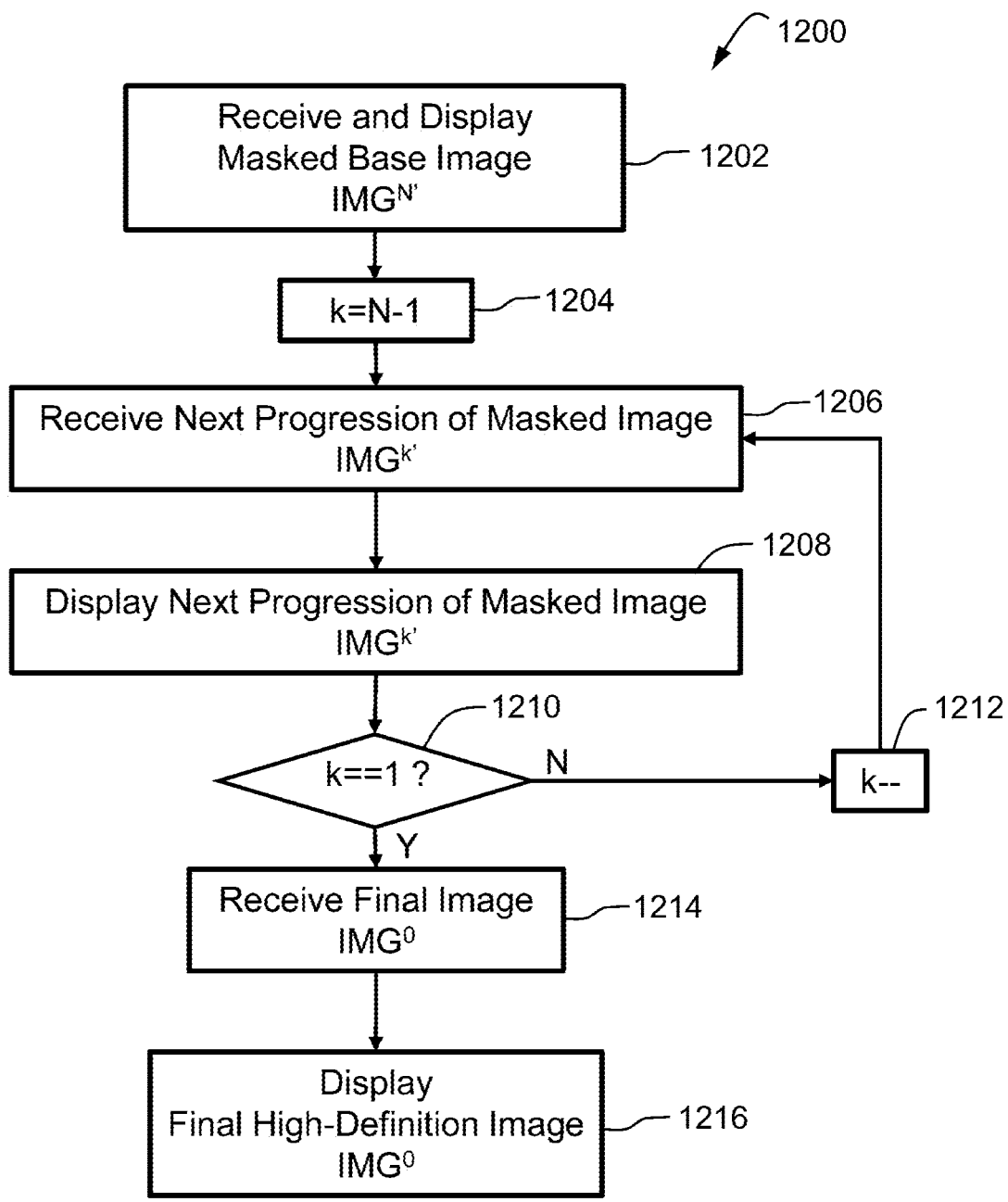
FIG. 12 illustrates a process for progressively receiving and displaying masked intermediate images and a final image of a progressively-displayed high-definition image, in accordance with the second aspect of the image processing system illustrated in FIG. 10.

Referring to FIG. 12, in accordance with the second-aspect image processing system 10, 10.2, an associated masked-progressive-image display process 1200 provides for displaying fully-formed masked lower-quality progressive images IMG$^{N'}$, IMG$^{N-1'}$, IMG$^{N-2'}$, ..., IMG$^{2'}$, IMG$^{1'}$ of progressively-increasing quality from the server device 18, culminating with receipt and display of the unmasked high-definition image 12, IMG$^0$. The masked base image IMG$^{N'}$ is first received and displayed in step (1202). Then, for an image component counter k—the value of which is initialized in step (1204) to one less than the total number of image components—for each of the masked lower-quality progressive images IMG$^{N'}$, IMG$^{N-1'}$, IMG$^{N-2'}$, ..., IMG$^{2'}$, IMG$^{1'}$, the next masked lower-quality progressive images IMG$^{k'}$ is received in step (1206) and displayed in step (1208), after which, in step (1210), if all masked lower-quality progressive images IMG$^{k'}$ have not been displayed, then, in step (1212), the image component counter k is decremented, and the process 1200 repeats beginning with step (1206). Otherwise, from step (1210), after all the lower-quality image components have been received and displayed, the unmasked high-definition image 12, IMG$^0$ is received in step (1214) and then displayed in step (1216).

The amount of spatial detail masking for the best progressive image presentation can be largely subjective. The mask filter or filtering algorithm provides for sufficiently masking the appearance of spatial detail so that the progressive process appears as a gradual removal of high spatial detail masking rather than a gradual increase in spatial quality itself. However, such masking necessarily diminishes the detail in the lower resolution images that may help the viewer more rapidly assimilate the content—the entire purpose of progressive imaging. So while a certain degree of masking can be applied to initial images to minimize the impression that the image is indeed one of lower quality, such masking would be weighed against the benefit of additional albeit low resolution detail. Accordingly, the relative subjectiveness of the ideal amount of masking suggests that general masking parameters, such as the amount of contrast modification, are somewhat flexible. To make the application of such masking simpler, such parameters may therefore be generally assigned based upon the actual native resolution, or inherent relative quality between a given low resolution image and the final image, rather than the actual content of those images, making such parameters a simple function of the given progressive imaging approach as modified by the inclinations of those tasked with determining such best parameters, rather than requiring an analysis of each image.

In accordance with another aspect of the image processing system 10, one may further artificially enhance the lower resolution image prior to the application of the masking process to bring out the appearance of higher spatial quality detail, as long as such enhancement does not simultaneously enhance the appearance of low spatial quality. Such enhancement may include, but is not limited to, artificial emphasis of edge structures in the image. Whereas such enhancement may be taken to an excessive degree when treating unmasked images of low spatial quality, thereby increasing an artificial appearance, the associated masking process will also decrease the visibility of such enhancement, allowing for more aggressive application of the enhancement prior to masking.

The progressive reduction of applied masking with progressive improvement in the inherent spatial image quality provides the effect of revealing an image which seems like it had always possessed high spatial quality, with the visibility of that high spatial quality being obscured by the masking. Yet another interpretation is that the high-quality image actually fades in, in front of the mask, and ultimately obscures the mask, making the mask gradually disappear while the high-quality image gradually appears. Accordingly, the characteristics of the masking process may include not only a reduction in the visibility of the low-quality image spatial detail, but may also include characteristics of a background image by blending the masked lower-quality image with the background image. As a very simple example, the masked low-quality image may include a degree of transparency, whether global or as a pixel level image transparency component, which is initially high and progressively decreases as the image quality progressively increases and as the contrast restriction progressively decreases, providing the effect of the high-quality image gradually appearing in front of such a background. As a similar example, the masked low-quality image may include progressive changes in brightness, such as may naturally and realistically occur when either gradually turning on a light, or even turning it down to improve visual contrast. This is particularly relevant when the background of a display is white, such as is the case with many internet websites, and the desired effect is to have an image progressively appear from the background.

Figures 13A, 13B:
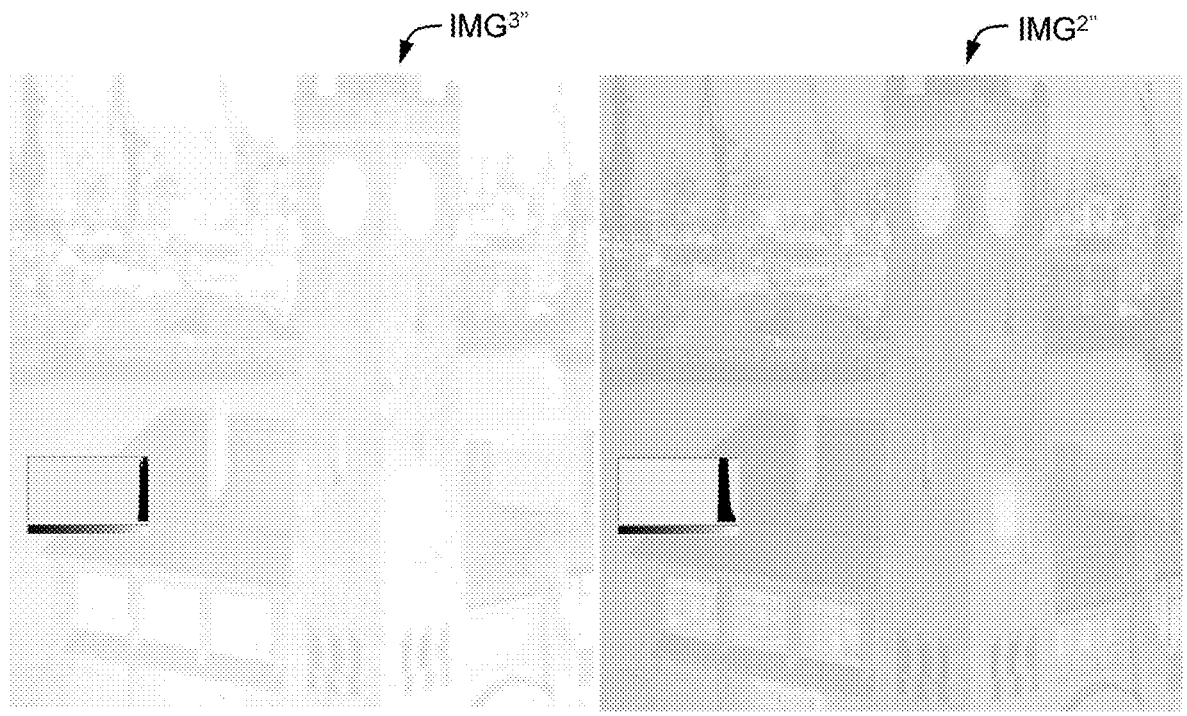
FIG. 13a is a compressed and tonally-shifted version of the first-progression, first-quality intermediate image illustrated in FIG. 4a, together with a histogram of associated image pixel values for the entire image illustrated in FIG. 13a, in accordance with a second aspect of an associated masking process.
FIG. 13b is a compressed and tonally-shifted version of the second-progression, second-quality intermediate image illustrated in FIG. 5a, together with a histogram of associated image pixel values for the entire image illustrated in FIG. 13b, in accordance with the second aspect of the associated masking process.
Figures 13C, 13D:
FIG. 13c is a compressed and tonally-shifted version of the third-progression, third-quality intermediate image illustrated in FIG. 6a, together with a histogram of associated image pixel values for the entire image illustrated in FIG. 13c, in accordance with the second aspect of the associated masking process.
FIG. 13d a copy of the high-definition image—the same as illustrated in FIGS. 4c, 5c, 6c, 7d and 8d—from which the intermediate images illustrated in FIGS. 13a-13c were derived, for purposes of comparison therewith, together with a histogram of associated image pixel values for the entire image illustrated in FIG. 13d.

As a further example, in accordance with a second aspect of a masking process, the intermediate images of FIGS. 4a, 5a and 6a are masked to both compress and shift their tonal values to create the respective masked lower-quality progressive images IMG$^{3''}$, IMG$^{2''}$, IMG$^{5''}$ of FIGS. 13a, 13b and 13c, respectively, culminating with the final, unmasked high-definition image 12, IMG$^0$ illustrated in FIG. 13d, all such images including their respective tonal histograms. The progressive images resulting from this second aspect of the masking process therefore provide a similar effect to the first aspect of the masking process—affecting contrast alone—in that the image offers the presumption or illusion that high spatial quality exists but, in this case, is being masked by a generally white mask which progressively fades to reveal the final image. However, since the generally white mask may initially create the same appearance as the white page background before the first, masked initial low-quality image appears (such a completely masked, uniform white image not shown), the high resolution image appears to be progressively revealed from the page as if fading in from that background, while also providing the illusion that presumably high spatial detail is simply being revealed as part of that process.

The utility of the masking process of the image processing system 10 fundamentally relies on the fact that a reduction in contrast makes spatial details in an image more difficult to see. In its most basic form, such a reduction can be either a linear or a non-linear compression, or even truncation of the tonal values of the image histogram. In fact, while brightness changes simply shift image tonal histogram rather than compress it, such shifting can ultimately act to also limit the histogram once existing, but shifted, tonal values reach either the maximum or minimum allowable levels, which is why brightness can ultimately be increased until the only remaining tonal level is the maximum (i.e. a uniformly bright image), or decreased until the only remaining tonal level is zero (i.e. a uniformly dark image), in both cases resulting in no remaining visible spatial detail. A similar explanation applies to changes in transparency, because the displayed pixel values are often a simple weighted averaging of foreground and background images. If the background image is completely white, then the tonal histogram of the composite image will be both compressed and shifted to white to a degree determined by the transparency. If the background image is completely black, then the tonal histogram of the composite image will be both compressed and shifted to black, again to a degree determined by the transparency. In both cases, since the tonal histogram of the displayed, composite image has been compressed, the spatial detail of the foreground image will be more difficult to see. Therefore the associated masking process of the image processing system 10 may combine a number of methods which effectively modify the visibility of spatial detail, so as to appear as an obscuration of that detail, without changing spatial detail itself, but rather, changing the visibility of that spatial detail through adjustment of the tonal values of the displayed image.

In general, the mask filters or masking algorithms may be applied to progressive images either in accordance with predetermined instructions given by a server device 18 to a client internet-connected receiving device 20, such as through the software encoding included in, or accessed by, a webpage 16, or may be applied independently by a client internet-connected receiving device 20 upon detection of a progressive image without such instruction. For example, progressive JPEG images are inherently encoded with, and detectable as, providing data for displaying progressively higher quality images, and a server device 18 may include instructions for the resultant masking of such progressive JPEG images. However, in the absence of such instructions, and upon such detection, a client internet-connected receiving device 20 may independently apply masking in accordance with general masking settings resident on the client internet-connected receiving device 20, such as settings within an internet browser application, which, for example, show the initial images of progressive JPEG images with higher transparency and then decreasing such transparency as the quality improves. Progressive JPEG images, while often requiring less bandwidth than non-progressive JPEG images, are at present little used in websites, presumably due to the low and artificial initial spatial quality as well as the difficulty in visually determining when the final image is achieved. The application of progressively-decreasing masking while image quality progressively increases may serve to mitigate these issues.

Accordingly, the masking of intermediate images associated with a progressive display of a high-definition image provides for significantly diminishing the often objectionable, obvious low or artificial visual spatial quality of the initial and intermediate images, while still providing sufficient, progressively improving image detail to accelerate the viewer's assimilation of the content of that image.

Figure 14:
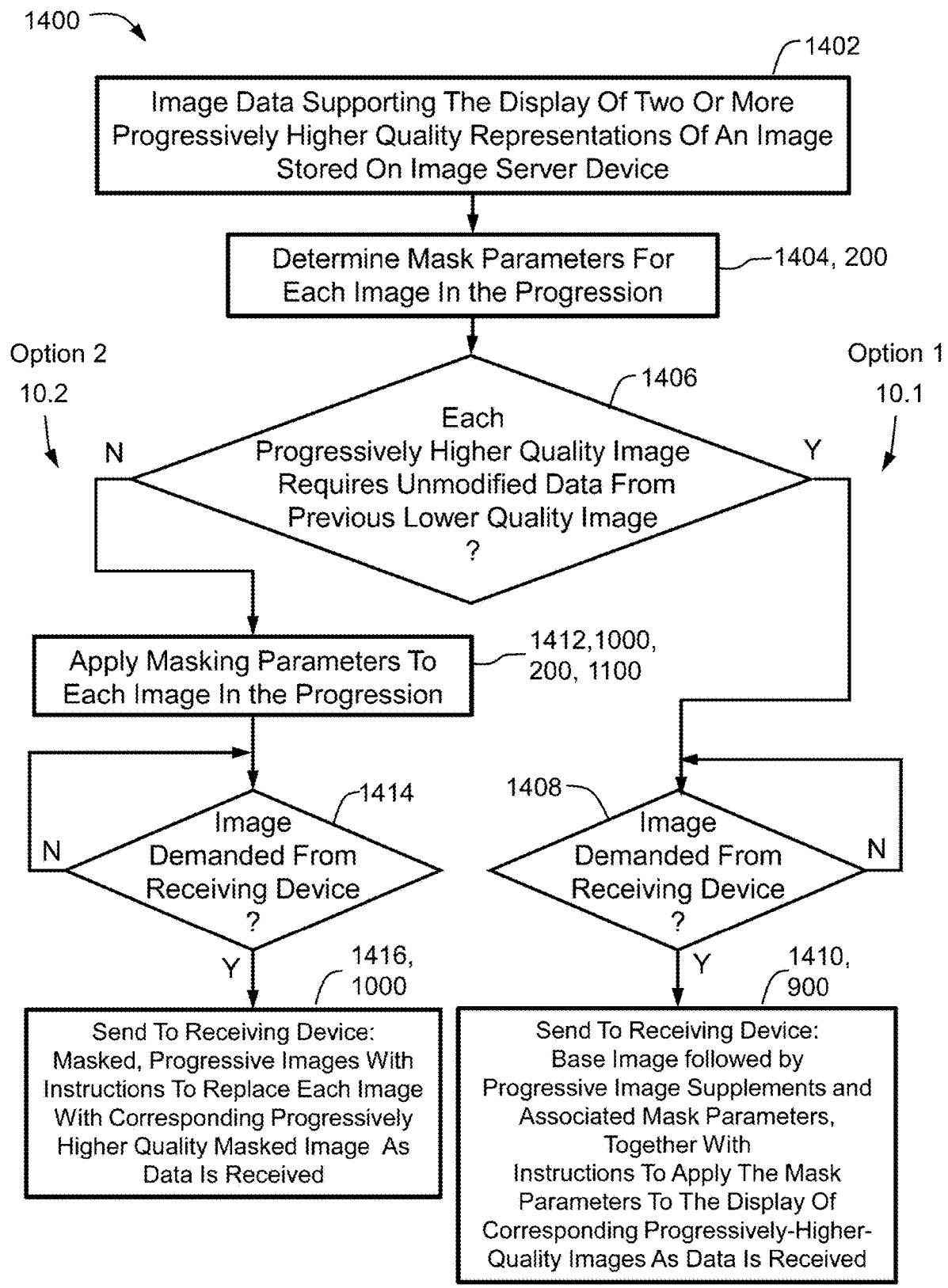
FIG. 14 illustrates a flow chart of the first and second aspects of the image processing system illustrated in FIGS. 1 and 10, respectively, from the point-of-view of an associated image server device.

Referring to FIG. 14, in accordance with either the first 10.1 or second 10.2 aspects of the image processing system 10, 10.1, 10.1', 10.1", 10.2, a method 1400 of processing and providing a progressively-encoded image—by a server device 18 acting as an image server—commences in step (1402) with receipt of a high-definition image 12, $IMG^0$, for example, from a website proprietor 14. Then, in step (1404), the associated mask parameters $\alpha^N, \alpha^{N-1}, \ldots, \alpha^2, \alpha^1$ are configured, for example, using the associated mask-filter design process 200 that is run on either the server device 18, or on a separate image server device 30.

Then, in step (1406), if each progressively-high-quality image component $IMG^{k-1}$ requires data from a previous-lower-quality image component $IMG^k$, i.e. as a result of progressive-encoding by an associated first-aspect progressive imaging process 26, 26.1, then, in step (1408), the server device 18 awaits a demand for an image from an associated client internet-connected receiving device 20, and upon receipt thereof, in step (1410), sends to the client internet-connected receiving device 20 the lowest-quality, base image $IMG^N$, following by the associated image supplements $\Delta(N-1,N), \Delta(N-2,N-1), \ldots, \Delta(2,3), \Delta(1,2), \Delta(0-,1)$ and, interleaved therewith, the associated mask parameters $\alpha^N, \alpha^{N-1}, \alpha^{N-2}, \ldots, \alpha^2, \alpha^1$, together with instructions to apply the mask parameters $\alpha^N, \alpha^{N-1}, \alpha^{N-2}, \ldots, \alpha^2, \alpha^1$ to the display of corresponding progressively-high-quality image component $IMG^{k-1}$ as data of the image supplements $\Delta(N-1,N), \Delta(N-2,N-1), \ldots, \Delta(2,3), \Delta(1,2), \Delta(0-, 1)$ and mask parameters $\alpha^N, \alpha^{N-1}, \alpha^{N-2}, \ldots, \alpha^2, \alpha^1$ is received, in accordance with the process 100 schematically illustrated in FIG. 1.

Otherwise, from step (1406), if the progressively-encoded images $IMG^k$ are generated in accordance with the second-aspect progressive-imaging process 26, 26.2, then, in step (1412), each lower-quality progressive images $IMG^N, IMG^{N-1}, IMG^{N-2}, \ldots, IMG^2, IMG^1$ is masked by a mask filter 28 using a corresponding associated mask parameter $\alpha^N, \alpha^{N-1}, \alpha^{N-2}, \ldots, \alpha^2, \alpha^1$ wherein the masking is done during the mask-filter design process 200, or by a subsequent progressive image-masking process 1100. Then, in step (1414), the server device 18 awaits a demand for an image from an associated client internet-connected receiving device 20, and upon receipt thereof, in step (1416), successively sends to the client internet-connected receiving device 20 each masked lower-quality progressive image $IMG^{N'}, IMG^{N-1'}, IMG^{N-2'}, \ldots, IMG^{2'}, IMG^{1'}$—in a succession of progressively-increasing image quality—following by the original high-definition image 12, $IMG^0$, for example, in accordance with the process 1000 schematically illustrated in FIG. 10.

Figure 15:
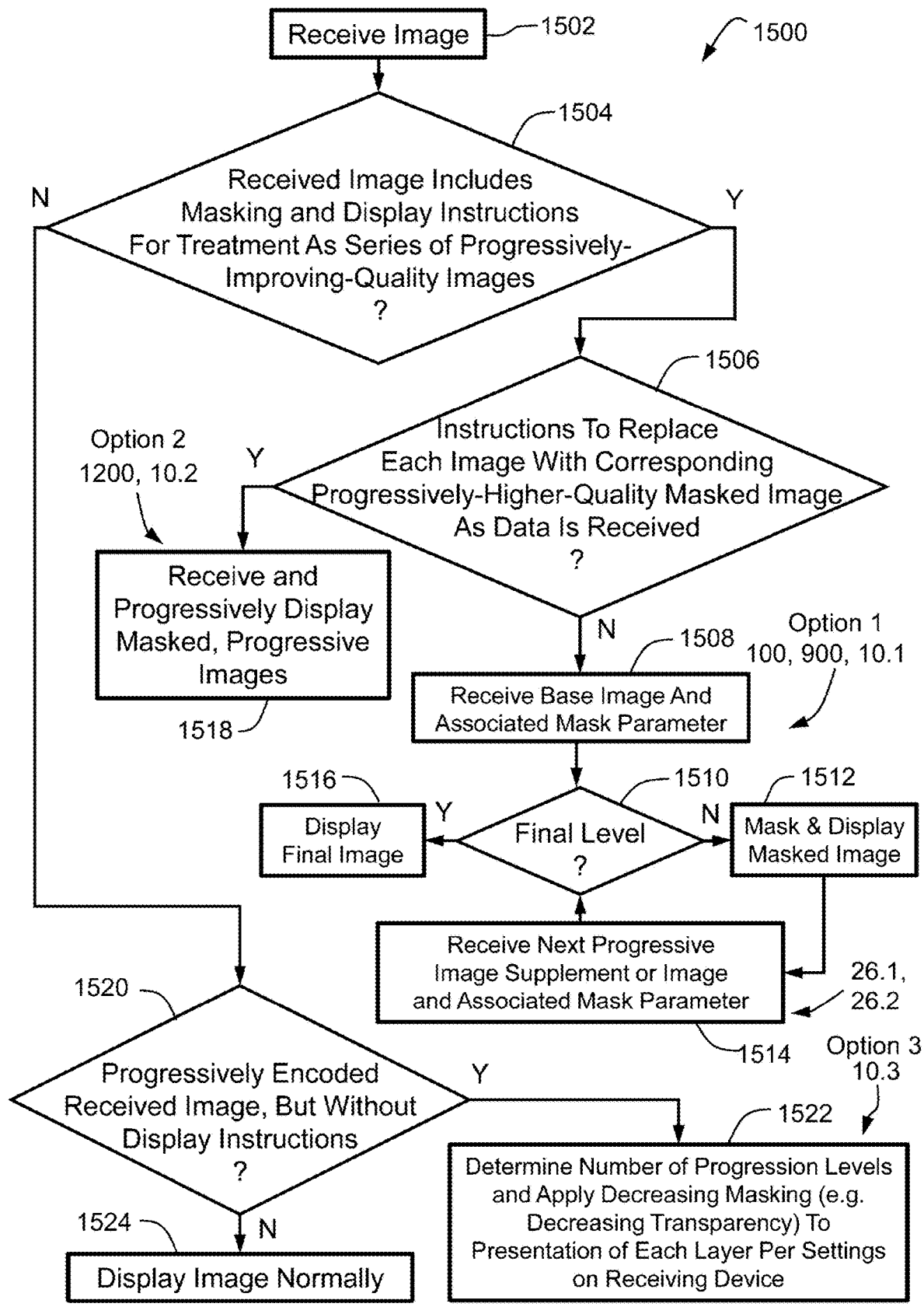
FIG. 15 illustrates a flow chart of the first and second aspects of the image processing system illustrated in FIGS. 1 and 10, respectively, from the point-of-view of an associated image receiving and display device.

Referring to FIG. 15, in accordance with either the first 10.1 or second 10.2 aspects of the image processing system 10, 10.1, 10.1', 10.1", 10.2, a method 1500 of processing and displaying a masked progressively-encoded image—by a client internet-connected receiving device 20—commences with receipt of an image in step (1502). If, in step (1504), the received image includes masking and display instructions that provide for treating the image as a series of progressively-improving-quality images, then, in step (1506), if the image does not contain instructions to replace each of the progressively-improving-quality images with a progressively-higher-quality masked image as data is received, i.e.

in accordance with a first-aspect image processing system 10, 10.1, 10.1', 10.1", also referred to as a first option, in step (1508), a base image IMG$^N$ is received. Then, in step (1510), if the current image is not the final high-definition image 12, IMG$^0$, then in step (1512), if the current, received image is not an image supplements Δ(k,k+1), then the current, received image is masked by the mask filter 28 using the associated mask parameter α$^k$ and then displayed. If the current, received image is an image supplements Δ(k,k+1)—in accordance with a first-aspect progressive imaging process 26, 26.1—then the corresponding lower-quality progressive images IMG$^{k-1}$ is first formed therefrom based upon the previous lower-quality progressive images IMG$^k$ before masking and display. Then, in step (1514), depending upon the progressive imaging process 26, 26.1, 26.2, the next image supplements Δ(k,k+1) or image IMG$^k$ is received, along with the associated mask parameter α$^k$, after which, the process repeats beginning with step (1510). Otherwise, from step (1510), if the final level of progress has been reached, then, in step (1516), the high-definition image 12, IMG$^0$ is displayed, without masking.

Otherwise, from step (1506), if the image contains instructions to replace each of the progressively-improving-quality images with a progressively-higher-quality masked image as data is received, i.e. in accordance with a second-aspect image processing system 10, 10.2, also referred to as a second option, in step (1518), the masked lower-quality progressive images IMG$^{N'}$, IMG$^{N-1'}$, IMG$^{N-2'}$, . . . , IMG$^{2'}$, IMG$^{1'}$, followed by the high-definition image 12, IMG$^0$, are received and progressively displayed in accordance with the masked-progressive-image display process 1200 illustrated in FIG. 12.

Otherwise, from step (1504), if the received image does not include masking and display instructions that provide for treating the image as a series of progressively-improving-quality images, then, in step (1520), if a progressively-encoded image has been received, but without display instructions, then, in accordance with a third aspect 10.3 of an image processing system 10, 10.3, also referred to as a third option, in step (1522), the number of progression levels is determined, and then successively decreasing levels of masking, for example, successively decreasing levels of transparency, are applied to each successive image of the progression, per setting on the client internet-connected receiving device 20, for example, predetermined settings, i.e. predetermined values for the associated mask parameters α$^N$, α$^{N-1}$, α$^{N-2}$, . . . , α$^2$, α$^1$. Otherwise, from step (1520), in step (1524), the image is displayed normally, without masking.

While specific embodiments have been described in detail in the foregoing detailed description and illustrated in the accompanying drawings, those with ordinary skill in the art will appreciate that various modifications and alternatives to those details could be developed in light of the overall teachings of the disclosure. It should be understood, that any reference herein to the term "or" is intended to mean an "inclusive or" or what is also known as a "logical OR", wherein when used as a logic statement, the expression "A or B" is true if either A or B is true, or if both A and B are true, and when used as a list of elements, the expression "A, B or C" is intended to include all combinations of the elements recited in the expression, for example, any of the elements selected from the group consisting of A, B, C, (A, B), (A, C), (B, C), and (A, B, C); and so on if additional elements are listed. Furthermore, it should also be understood that the indefinite articles "a" or "an", and the corresponding associated definite articles "the" or "said", are each intended to mean one or more unless otherwise stated, implied, or physically impossible. Yet further, it should be understood that the expressions "at least one of A and B, etc.", "at least one of A or B, etc.", "selected from A and B, etc." and "selected from A or B, etc." are each intended to mean either any recited element individually or any combination of two or more elements, for example, any of the elements from the group consisting of "A", "B", and "A AND B together", etc. Yet further, it should be understood that the expressions "one of A and B, etc." and "one of A or B, etc." are each intended to mean any of the recited elements individually alone, for example, either A alone or B alone, etc., but not A AND B together. Furthermore, it should also be understood that unless indicated otherwise or unless physically impossible, that the above-described embodiments and aspects can be used in combination with one another and are not mutually exclusive. Accordingly, the particular arrangements disclosed are meant to be illustrative only and not limiting as to the scope of the invention, which is to be given the full breadth of the appended claims, and any and all equivalents thereof.

What is claimed is:

1. A method of processing a progressively-encoded image, comprising transmitting to a recipient a plurality of image components of the progressively-encoded image, wherein successive image components of said plurality of image components are associated with images of successively increasing image-quality, each image component of said plurality of image components is masked to obscure detailed features of said image, while retaining a recognizable representation of an unmasked version of said image, and a degree to which each said image component is masked is inversely related to said image-quality of said image component.

2. A method of processing a progressively-encoded image as recited in claim 1, further comprising:
  a. receiving a highest-definition image;
  b. progressively encoding said highest-definition image so as to generate a plurality of unmasked image components of said progressively-encoded image; and
  c. storing at least one set of stored image components selected from said plurality of unmasked image components and said plurality of image components.

3. A method of processing a progressively-encoded image as recited in claim 2, wherein said highest-definition image is received from a proprietor of a website on which said progressively-encoded image is intended to be displayed.

4. A method of processing a progressively-encoded image as recited in claim 2, further comprising generating said plurality of image components by masking each of said plurality of unmasked image components with a mask filter using a corresponding set of mask parameters of a corresponding plurality of sets of mask parameters.

5. A method of processing a progressively-encoded image as recited in claim 4, further comprising storing said plurality of image components for later transmission to said recipient upon demand from said recipient.

6. A method of processing a progressively-encoded image as recited in claim 4, wherein each image component of said plurality of image components is generated from a corresponding stored unmasked image component of said plurality of unmasked image components by said mask filter using said corresponding set of mask parameters responsive to a demand for said progressively-encoded image from said recipient.

7. A method of processing a progressively-encoded image as recited in claim 4, further comprising:
   a. providing for a user to interactively adjust at least one set of mask parameters of said plurality of sets of mask parameters responsive to a display of a corresponding image component of said plurality of image components filtered by said mask filter responsive to said at least one set of mask parameters; and
   b. storing said at least one set of mask parameters in association with said corresponding image component.

8. A method of processing a progressively-encoded image as recited in claim 4, wherein each set of mask parameters of said plurality of sets of mask parameters comprises a value for each of at least one mask parameter selected from a measure of contrast, a measure of transparency, a measure of brightness, a measure of color, a measure of a range of tonal values, a measure of a shift of a range of tonal values, and a characterization of an associated image histogram; and said value for each said at least one mask parameter provides for obscuring artifacts in a corresponding said image component to an extent that is inversely related to said image-quality of said image component.

9. A method of processing a progressively-encoded image as recited in claim 2, further comprising enhancing edge detail of at least one relatively-lower-definition unmasked image component of said plurality of unmasked image components prior to said plurality of image components being masked to obscure said detailed features of said image.

10. A method of processing a progressively-encoded image as recited in claim 1, wherein said plurality of image components comprise a lowest-definition base image and a plurality of progressively-relatively-higher-definition images culminating with the image that was progressively encoded.

11. A method of processing a progressively-encoded image as recited in claim 1, further comprising receiving a plurality of unmasked image components of said progressively-encoded image and a corresponding plurality of sets of mask parameters from a separate image processing application.

12. A method of processing a progressively-encoded image as recited in claim 1, further comprising receiving said plurality of image components from a separate image processing application.

13. A method of processing a progressively-encoded image, comprising:
   a. receiving a plurality of image components of the progressively-encoded image, wherein successive image components of said plurality of image components are associated with images of successively increasing image-quality, each image component of said plurality of image components is masked to obscure detailed features of said image, while retaining a recognizable representation of an unmasked version of said image, and a degree to which each said image component is masked is inversely related to said image-quality of said image component; and
   b. displaying each of said plurality of image components in succession on a display device.

14. A method of processing a progressively-encoded image as recited in claim 13, wherein said plurality of image components comprise a lowest-definition base image and a plurality of progressively-relatively-higher-definition images culminating with the image that was progressively encoded.

15. A method of processing a progressively-encoded image as recited in claim 13, wherein each of said plurality of image components is masked by masking each of a corresponding plurality of unmasked image components with a mask filter using a corresponding set of mask parameters of a corresponding plurality of sets of mask parameters.

16. A method of processing a progressively-encoded image as recited in claim 15, wherein each set of mask parameters of said plurality of sets of mask parameters comprises a value for each of at least one mask parameter selected from a measure of contrast, a measure of transparency, a measure of brightness, a measure of color, a measure of a range of tonal values, a measure of a shift of a range of tonal values, and a characterization of an associated image histogram; and said value for each said at least one mask parameter provides for obscuring artifacts in a corresponding said image component to an extent that is inversely related to said image-quality of said image component.

17. A method of processing a progressively-encoded image, comprising:
   a. progressively encoding a highest-definition image so as to form a plurality of image components, wherein each image component of said plurality of image components is of successively increasing image-quality, but of lesser said image-quality than said highest-definition image; and
   b. obscuring artifacts in each said image component that are not present in said highest-definition image with a mask filter that provides for retaining in said image component a recognizable representation of said highest-definition image, wherein the extent to which said artifacts are obscured by said mask filter is inversely related to said image-quality of said image component.

18. A method of processing a progressively-encoded image as recited in claim 17, wherein the operation of progressively encoding said highest-definition image comprises:
   a. causing said highest-definition image to be transmitted to an image processing application so as to generate said plurality of image components of said progressively-encoded image; and
   b. causing said plurality of image components to be stored on an image server.

19. A method of processing a progressively-encoded image as recited in claim 18, further comprising:
   a. interactively adjusting at least one set of mask parameters responsive to a display of a filtered version of a corresponding image component of said plurality of image components filtered by said mask filter responsive to said at least one set of mask parameters; and
   b. causing said at least one set of mask parameters to be stored on said image server in correspondence with a corresponding said image component.

20. A method of processing a progressively-encoded image as recited in claim 19, wherein the operation of interactively adjusting said at least one set of mask parameters occurs on said image server.

21. A method of processing a progressively-encoded image as recited in claim 19, further comprising:
   a. masking each of said plurality of image components with said mask filter using a corresponding said at least one set of mask parameters so as to generate said plurality of image components, and
   b. causing said plurality of image components to be stored on said image server.

22. A method of processing a progressively-encoded image as recited in claim 19, wherein said at least one set of mask parameters comprises a value for each of at least one mask parameter selected from a measure of contrast, a measure of transparency, a measure of brightness, a measure of color, a measure of a range of tonal values, a measure of a shift of a range of tonal values, and a characterization of an associated image histogram; and said value for each said at least one mask parameter provides for obscuring said artifacts in a corresponding said image component to an extent that is inversely related to said image-quality of said image component.

23. A method of processing a progressively-encoded image as recited in claim 18, wherein said image processing application is operative on said image server.

\* \* \* \* \*